United States Patent
Akahori

(10) Patent No.: US 9,219,510 B2
(45) Date of Patent: Dec. 22, 2015

(54) SIGNAL RECEIVING SYSTEM, SEMICONDUCTOR DEVICE, AND SIGNAL RECEIVING METHOD

(71) Applicant: LAPIS Semiconductor Co., Ltd., Yokohama (JP)

(72) Inventor: Hiroji Akahori, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 0 days.

(21) Appl. No.: 14/141,842

(22) Filed: Dec. 27, 2013

(65) Prior Publication Data

US 2014/0185694 A1 Jul. 3, 2014

(30) Foreign Application Priority Data

Dec. 28, 2012 (JP) ................. 2012-287707

(51) Int. Cl.
| | |
|---|---|
| H04L 27/26 | (2006.01) |
| H04B 1/10 | (2006.01) |
| H04B 1/525 | (2015.01) |
| H04B 3/54 | (2006.01) |
| H04B 7/08 | (2006.01) |
| H04L 5/00 | (2006.01) |
| H04L 27/00 | (2006.01) |
| H04L 1/00 | (2006.01) |

(52) U.S. Cl.
CPC ............... *H04B 1/10* (2013.01); *H04B 1/1009* (2013.01); *H04B 1/109* (2013.01); *H04B 1/525* (2013.01); *H04B 3/548* (2013.01); *H04B 7/084* (2013.01); *H04L 1/0003* (2013.01); *H04L 5/006* (2013.01); *H04L 5/0007* (2013.01); *H04L 5/0046* (2013.01); *H04L 27/2657* (2013.01); *H04L 27/2662* (2013.01); *H04L 2027/0022* (2013.01); *H04L 2027/0028* (2013.01); *H04L 2027/0065* (2013.01)

(58) Field of Classification Search
CPC .................................. H04L 27/26; H04B 1/10
USPC .......................................................... 375/340
See application file for complete search history.

(56) References Cited

U.S. PATENT DOCUMENTS

| | | | |
|---|---|---|---|
| 2002/0137464 A1* | 9/2002 | Dolgonos et al. ............... | 455/60 |
| 2004/0125820 A1* | 7/2004 | Rios .............................. | 370/480 |
| 2007/0224942 A1* | 9/2007 | Kuramoto et al. ......... | 455/67.11 |
| 2010/0329223 A1* | 12/2010 | Matsumura ................... | 370/338 |
| 2011/0200089 A1* | 8/2011 | Umeda et al. ................. | 375/232 |
| 2012/0230380 A1* | 9/2012 | Keusgen et al. .............. | 375/227 |
| 2013/0122820 A1* | 5/2013 | Horio et al. ................ | 455/67.11 |

FOREIGN PATENT DOCUMENTS

JP     2012-074905 A     4/2012

* cited by examiner

*Primary Examiner* — Jaison Joseph
(74) *Attorney, Agent, or Firm* — Rabin & Berdo, P.C.

(57) ABSTRACT

A signal receiving device obtains information data based on a plurality of signals received at a plurality of antennas. The signal receiving device is divided into a first receiving unit and a second receiving unit. The first receiving unit carries out certain part of an entire receiving process, and the second receiving unit carries out the remaining part of the receiving process. The first receiving unit demodulates and synthesizes the received signals and decodes the synthesized signal to recover received information data. The first receiving unit modulates the received information data to obtain a modulation signal and transmits the modulation signal to the second receiving unit via a transmission cable. The second receiving unit recovers the received information data by demodulating the modulation signal received via the transmission cable, and obtains the information data by decoding the recovered information data.

18 Claims, 12 Drawing Sheets

SIGNAL RECEIVING SYSTEM, SEMICONDUCTOR DEVICE, AND SIGNAL RECEIVING METHOD

FIELD OF THE INVENTION

The present invention relates to a signal receiving device that receives a broadcast wave with a plurality of antennas, and to a semiconductor device having such signal receiving device. The present invention also relates to a method for receiving signals, which is used in the signal receiving device and the semiconductor device.

DESCRIPTION OF THE RELATED ART

A signal receiver that receives a broadcast wave with a plurality of antennas such as a vehicle-mounted diversity receiver includes a plurality of antennas, a receiver casing, a receiver module, and a plurality of antenna cables. The antennas are installed at a roof or a rear glass of a vehicle. The receiver casing is installed at a center console in a vehicle cabin. The receiver module is placed in the casing. The antenna cables couple between the respective antennas and the receiver module. Therefore, the vehicle-mounted diversity receiver requires a plurality of long antenna cables for transmitting high frequency signals. This increases a cost.

One example of a signal receiving system is disclosed in Japanese Patent Application Publication (Kokai) No. 2012-74905. In this system, a signal receiving module or device for carrying out a signal receiving process is divided into two parts, i.e., a front part and a rear part. The front part is disposed adjacent to the antenna, and the rear part is disposed at a center console in a vehicle cabin. The front part of the receiving system performs a frequency conversion and a demodulation process on a high-frequency signal obtained by receiving a broadcast wave with a plurality of antennas. Thus, demodulated signals are obtained for the respective antennas. The demodulated signals are digitally multiplexed and transmitted to the rear part. The rear part performs demultiplexing on the digital signals to obtain the demodulated signals for the respective antennas.

In this type of signal receiving system, a digital signal flows along a relatively long transmission path from the roof or the rear glass of the vehicle to the center console in the vehicle cabin. Accordingly, high frequency noise specific to a digital signal, which leaks from the transmission path, may go around and be mixed into the front part. This deteriorates the receiving sensitivity.

SUMMARY OF THE INVENTION

One object of the present invention is to provide a low-cost signal receiving device that can reduce degradation in receiving sensitivity and can eliminate noises.

Another object of the present invention is to provide a semiconductor device having such signal receiving device.

Still another object of the present invention is to provide a signal receiving method used for such signal receiving device and such semiconductor device.

According to one aspect of the present invention, there is provided a signal receiving device for obtaining information data (information and/or data) based on a plurality of signals obtained by receiving a broadcast wave, which carries coded information data, with a plurality of antennas. The signal receiving device includes a first receiving unit, a second receiving unit and a transmission cable that connects the first receiving unit to the second receiving unit. The first receiving unit includes a demodulation decoding unit and a first transmission processor. The demodulation decoding unit demodulates and synthesizes the received signals and decodes the synthesized signal to obtain received information data. The first transmission processor performs a predetermined modulation process on the received information data and delivers the resulting signal (received information modulation signal) to the transmission cable. The second receiving unit includes a first receiving processor and a data decoder. The first receiving processor receives the received information modulation signal via the transmission cable, demodulates the information modulation signal with a demodulation process that corresponds to the predetermined modulation, and obtains the received information data. The data decoder obtains the information data by decoding the received information data.

According to another aspect of the present invention, there is provided a semiconductor device that includes a signal receiving device for obtaining information data based on a plurality of signal received. These received signals are obtained by receiving a broadcast wave, which carries coded information data, at a plurality of antennas. The semiconductor device includes a first semiconductor chip, a second semiconductor chip, and a transmission cable that connects the first semiconductor chip to the second semiconductor chip. The first semiconductor chip includes a demodulation decoding circuit and a first transmission circuit. The demodulation decoding circuit demodulates and synthesizes the received signals and decodes the synthesized signal to obtain received information data. The first transmission circuit performs a predetermined modulation process on the received information data to obtain a received information modulation signal, and sends the received information modulation signal to the transmission cable. The second semiconductor chip includes a first receiving circuit and a data decoder. The first receiving circuit receives the received information modulation signal via the transmission cable and obtains the received information data by demodulating the received information modulation signal with a demodulation process that corresponds to the predetermined modulation process. The data decoder obtains the information data by decoding the received information data.

According to still another aspect of the present invention, there is provided a signal receiving method for obtaining information data based on a plurality of signals. The signals are obtained by receiving a broadcast wave, which carries coded information data, at a plurality of antennas. The signal receiving method includes demodulating and synthesizing the received signals and decoding the synthesized signal to obtain received information data. The method also includes performing a predetermined modulation process on the received information data to obtain a received information modulation signal. The method also includes sending the received information modulation signal to a transmission cable. The method also includes receiving the received information modulation signal via the transmission cable. The method also includes demodulating the received information modulation signal with a demodulation process which corresponds to the predetermined modulation process to obtain the received information data. The method also includes decoding the received information data to obtain the information data.

The signal receiving device of the invention obtains information data based on the signals received at the antennas. The signal receiving device is divided into the first (front side) receiving unit and the second (rear side) receiving unit. The first receiving unit is connected to the second receiving unit by the transmission cable. The first receiving unit carries out certain part (referred to as "front part") of the entire signal receiving process and the second receiving unit carries out the remaining part (referred to as "rear part") of the entire signal receiving process. Specifically, the first receiving unit demodulates and synthesizes the received signals and decodes the synthesized signal to recover received information data. The first receiving unit also modulates the received information data to obtain a received information modulation signal and sends the received information modulation signal to the second receiving unit through the transmission cable. The second receiving unit receives the received information modulation signal via the transmission cable, demodulates the received information modulation signal to recover the received information data, and obtains the information data by decoding the recovered information data.

This configuration can reduce the length of the high frequency transmission cable coupled between the antennas and the first receiving unit, and contributes to cost reduction. The received information data is a rectangular wave composed of a binary signal series derived from the received signals. The first receiving unit applies the modulation process on the received information data, and sends the resulting modulation data to the second receiving unit. This reduces intensity of radiation noise emitted from the transmission cable compared with a configuration in which the received information data recovered in the first receiving unit is directly transmitted to the second receiving unit via the transmission cable. Accordingly, degradation in signal-receiving sensitivity caused by the radiation noise mixed in the first receiving unit can be reduced.

These and other objects, aspects and advantages of the present invention will become apparent to those skilled in the art from the following detailed description when read and understood in conjunction with the appended claims and drawings.

DETAILED DESCRIPTION OF THE INVENTION

Figure 1:
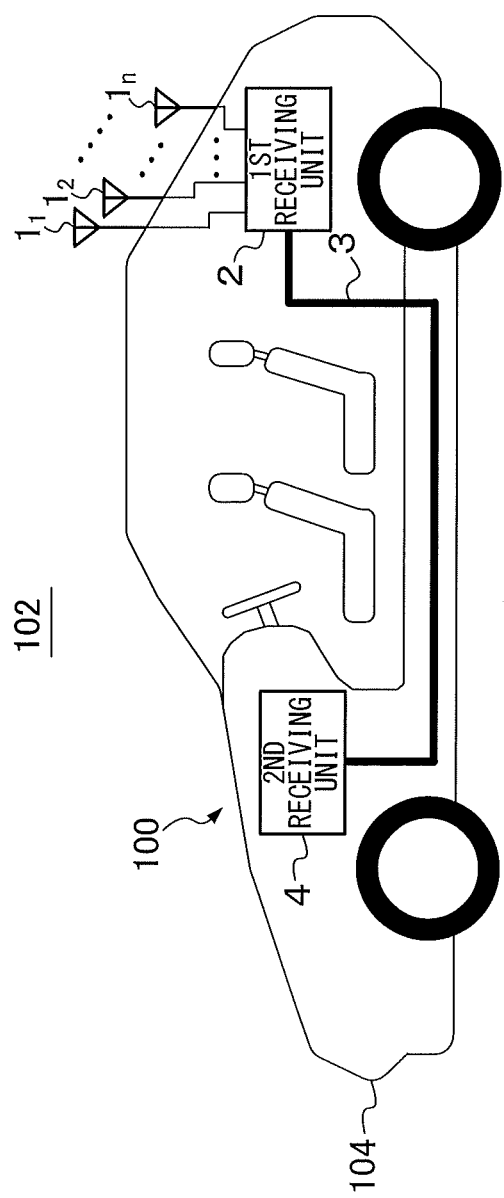
FIG. 1 is a schematic view of a vehicle-mounted diversity receiving system with a signal receiving device according to a first exemplary embodiment of the present invention.

Embodiments of the present invention will be described with reference to the drawings. Referring first to FIG. 1, a general structure of a vehicle-mounted diversity signal receiving system 100 equipped with a signal (i.e., broadcast wave) receiving device 102 will be described.

The vehicle-mounted diversity signal receiving system 100 includes n (n is an integer equal to or more than two) antennas $1_1$ to $1_n$, a first semiconductor chip, a transmission cable 3, and a second semiconductor chip. The antennas $1_1$ to $1_n$ are installed at, for example, a rear window (or a windshield) of a vehicle 104. The first semiconductor chip is installed adjacent to the antennas $1_1$ to $1_n$ and have a first receiving unit 2. The second semiconductor chip has a second receiving unit 4. The signal receiving system 100 provided on the vehicle 104 receives a broadcast wave. The broadcast wave is prepared by applying, for example, an Orthogonal Frequency Division Multiplexing (OFDM) modulation on voice (audio) data and video data. It should be noted that prior to this modulation, the audio data and video data are converted into Moving Picture Experts Group (MPEG) data in accordance with moving picture compression standard such as "H.264/MPEG-4 AVC" or "MPEG-2."

Figure 2:
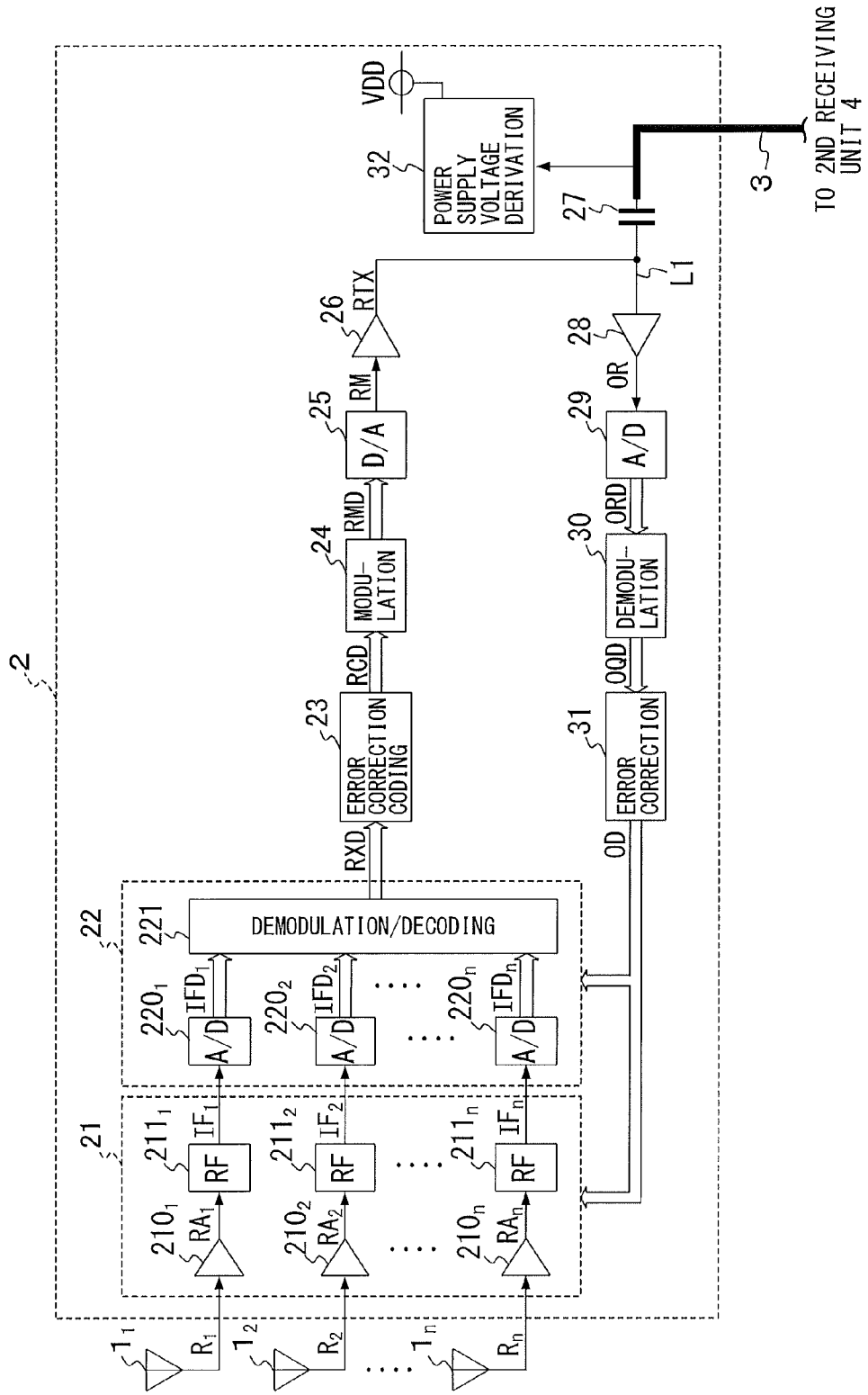
FIG. 2 is a block diagram illustrating an internal configuration of a first receiving unit shown in FIG. 1.

Referring to FIG. 2, an internal configuration of the first receiving unit 2 will be described.

In FIG. 2, the antennas $1_1$ to $1_n$ each receive a broadcast wave individually and obtain respective high-frequency signals $R_1$ to $R_n$. The high-frequency signals $R_1$ to $R_n$ are supplied to a high-frequency signal processor 21 of the first receiving unit 2 via individual high frequency transmission cables.

The high-frequency signal processor 21 includes low-noise amplifiers $210_1$ to $210_n$ and RF circuits $211_1$ to $211_n$. The low-noise amplifiers $210_1$ to $210_n$ supply the RF circuits $211_1$ to $211_n$ with high-frequency signals $RA_1$ to $RA_n$, which are obtained by amplifying the high-frequency signals $R_1$ to $R_n$ individually. The RF circuits $211_1$ to $211_n$ supply a demodulation/decoding processor 22 with received signals $IF_1$ to $IF_n$ in an intermediate frequency band. The received signals $IF_1$ to $IF_n$ are obtained by respectively down-converting the high-frequency signals $RA_1$ to $RA_n$ into the frequency band of a broadcasting station indicated by station-selecting information given by operation data OD (described below).

The demodulation/decoding processor 22 includes A/D converters $220_1$ to $220_n$ and a demodulation/decoding circuit 221. The A/D converters $220_1$ to $220_n$ convert the levels of the received signals $IF_1$ to $IF_n$ into digital received data signals $IFD_1$ to $IFD_n$, respectively. The digital received data signals $IFD_1$ to $IFD_n$ are introduced to the demodulation/decoding circuit 221.

The demodulation/decoding circuit 221 synthesizes the received data signals $IFD_1$ to $IFD_n$. In other words, the received data signals $IFD_1$ to $IFD_n$ are added with weighting (or subtracted). Thus, a synthesized received data signal is obtained. Then, the demodulation/decoding circuit 221 demodulates the synthesized received data signal with a demodulation method corresponding to a modulation method of the broadcast wave, thereby obtaining demodulation data. Then, the demodulation/decoding circuit 221 obtains received information data RXD in the MPEG data format in accordance with a moving picture compression-encoding technique such as "H.264/MPEG-4 AVC" or "MPEG-2" by, for example, decoding the demodulation data. The demodulation/decoding circuit 221 sends the received information data RXD to an error correction coding circuit 23.

The error correction coding circuit 23 performs error correction coding on the received information data RXD to obtain the received information data RCD and supplies a modulation circuit 24 with the received information data RCD. The modulation circuit 24 obtains a received information modulation signal RMD by performing, for example, an OFDM modulation, which is the same as the modulation of the broadcast wave, or a Quadrature Phase Shift Keying (QPSK) modulation, or a digital modulation such as Quadrature Amplitude Modulation (QAM) on the received information data RCD. The modulation circuit 24 sends this modulation signal RMD to a D/A converter 25. The D/A converter 25 obtains an analog modulation signal RM by converting one-bit data series of the modulation signal RMD into an analog signal. The D/A converter 25 sends this analog modulation signal RM to a transmission-side amplifier 26. The transmission-side amplifier 26 obtains an amplified modulation signal RTX by amplifying the analog modulation signal RM, and sends the amplified modulation signal RTX to the second receiving unit 4 via a line L1, a capacitor 27, and a signal line of the transmission cable 3. The transmission cable 3 is a two-core cable including a signal line, which is used for transmission of the amplified modulation signal RTX, and a grounding line.

One end of the capacitor 27 is coupled to the signal line of the transmission cable 3. The other end of the capacitor 27 is coupled to the output terminal of the transmission-side amplifier 26 and an input terminal of a receiving-side amplifier 28 through the line L1. The capacitor 27 prevents a DC component on the signal line of the transmission cable 3 from flowing into the line L1.

The receiving-side amplifier 28 receives an operation data modulation signal transmitted from the second receiving unit 4 via the transmission cable 3 and the capacitor 27 and then amplifies the operation data modulation signal to obtain an operation data modulation signal OR. The receiving-side amplifier 28 sends this operation data modulation signal OR to an A/D converter 29. The A/D converter 29 converts the operation data modulation signal OR into the operation data modulation signal ORD formed of binary data series. The A/D converter 29 sends this operation data modulation signal ORD to a demodulation circuit 30. The demodulation circuit 30 demodulates the operation data modulation signal ORD with a demodulation process that corresponds to the modulation process by a modulation circuit 42 (described below) of the second receiving unit 4 to recover the operation data. The demodulation circuit 30 sends this recovered operation data as operation data OQD to an error correction circuit 31. The error correction circuit 31 performs an error correction process on the operation data OQD to obtain the operation data OD with error bit(s) corrected. The error correction circuit 31 sends this operation data OD to the high-frequency signal processor 21 and the demodulation/decoding processor 22. When the operation data OD represents a signal receiving operation start instruction, the high-frequency signal processor 21 and the demodulation/decoding processor 22 start the above-described operation. On the other hand, when the operation data OD represents a receiving operation termination instruction, the high-frequency signal processor 21 and the demodulation/decoding processor 22 stop the operation. In other words, when the first receiving unit 2 receives the operation data OD indicative of the receiving operation start instruction after power-ON, the first receiving unit 2 starts receiving the broadcast wave. Afterwards, when the first receiving unit 2 receives the operation data OD indicative of the signal receiving operation termination instruction, the first receiving unit 2 stops the receiving operation.

A power supply voltage derivation circuit 32 derives a DC power supply voltage VDD superimposed on the signal line of the transmission cable 3. The power supply voltage derivation circuit 32 sends the DC power supply voltage VDD to each of the high-frequency signal processor 21, the demodulation/decoding processor 22, the error correction coding circuit 23, the modulation circuit 24, the D/A converter 25, the transmission-side amplifier 26, the receiving-side amplifier 28, the A/D converter 29, the demodulation circuit 30, and the error correction circuit 31 for their operation.

Figure 3:
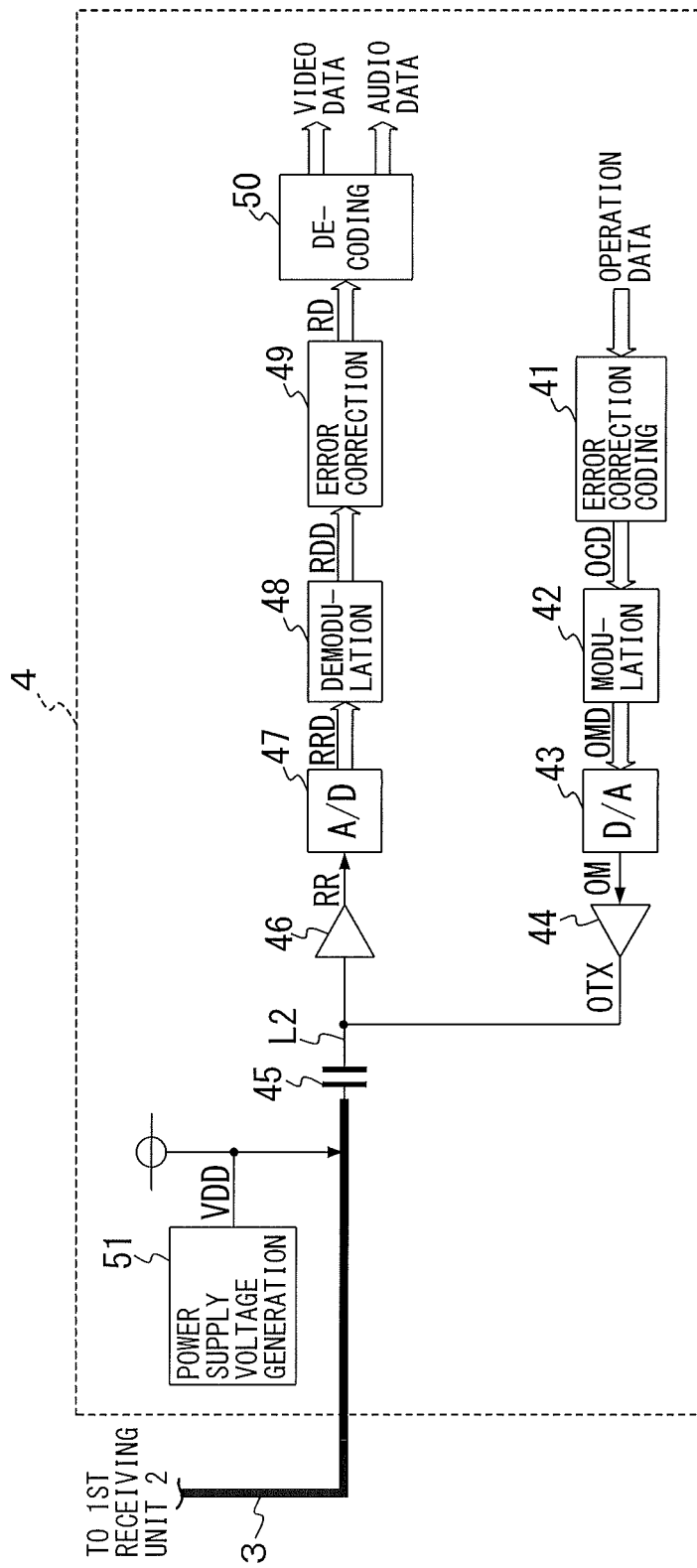
FIG. 3 is a block diagram illustrating an internal configuration of a second receiving unit shown in FIG. 1.

FIG. 3 is a block diagram illustrating an exemplary internal configuration of the second receiving unit 4.

In FIG. 3, an error correction coding circuit 41 performs error correction coding on the operation data including the station-selecting information and the instruction for start or termination of the signal receiving operation to obtain operation data OCD. The error correction coding circuit 41 sends this operation data OCD to the modulation circuit 42. The operation data is created by an operating unit (not shown) in accordance with a user's operation of selecting a broadcasting station and a user's operation of starting or terminating the signal receiving operation.

The modulation circuit 42 obtains an operation data modulation signal OMD by performing, for example, an OFDM modulation, which is the same as the modulation performed on the broadcast wave, a QPSK modulation, or a digital modulation such as QAM on the operation data OCD. The modulation circuit 42 sends the modulation signal OMD to a D/A converter 43. The D/A converter 43 obtains an operation data modulation signal OM by converting one-bit data series of the modulation signal OMD into an analog signal. The D/A converter 43 sends the analog modulation signal OM to a transmission-side amplifier 44. The transmission-side amplifier 44 obtains an operation data modulation signal OTX by amplifying the analog modulation signal OM, and sends the modulation signal OTX to the first receiving unit 2 via a line L2, a capacitor 45, and a signal line of the transmission cable 3.

One end of the capacitor 45 is coupled to the signal line of the transmission cable 3. The other end of the capacitor 45 is coupled to the output terminal of the transmission-side amplifier 44 and an input terminal of a receiving-side amplifier 46 through the line L2. The capacitor 45 prevents a DC component on the signal line of the transmission cable 3 from flowing into the line L2.

The receiving-side amplifier 46 receives a modulation signal from the first receiving unit 2 via the transmission cable 3 and the capacitor 45 and then amplifies the modulation signal to obtain a received information modulation signal RR. The receiving-side amplifier 46 sends the amplified modulation signal RR to an A/D converter 47. The A/D converter 47 converts the modulation signal RR into a modulation signal RRD formed of binary data series. The A/D converter 47 sends the received information data modulation signal RRD to a demodulation circuit 48. The demodulation circuit 48 demodulates the modulation signal RRD with a demodulation process, which corresponds to the modulation process performed by the modulation circuit 24 of the first receiving unit 2, to recover the received information data RDD in the MPEG format. The demodulation circuit 48 sends the information data RDD to an error correction circuit 49. The error correction circuit 49 performs an error correction process on the information data RDD to obtain information data RD with error bit (s) corrected. The error correction circuit 49 sends the information data RD to a received data decoder 50. The received data decoder 50 is, for example, an MPEG decoder. The received data decoder 50 performs an MPEG decoding process on the received information data RD (MPEG data) to obtain video and audio data as information data received from the broadcasting station.

A power supply voltage generating circuit 51 generates the DC power supply voltage VDD and sends this DC power supply voltage VDD to each component in the second receiving unit 4, that is, the error correction coding circuit 41, the modulation circuit 42, the D/A converter 43, the transmission-side amplifier 44, the capacitor 45, the receiving-side amplifier 46, the A/D converter 47, the demodulation circuit 48, the error correction circuit 49, and the received data decoder 50 for their operation. Further, the power supply voltage generating circuit 51 applies the power supply voltage VDD onto the signal line of the transmission cable 3 to supply the first receiving unit 2 with the power supply voltage VDD.

That is, the received information modulation signal RTX and the operation data modulation signal OTX are bidirectionally transmitted between the first receiving unit 2 and the second receiving unit 4 via a single signal line in a state where the DC power supply voltage VDD is superimposed on this single signal line in the transmission cable 3. Time Division Duplex (TDD) communications or Frequency Division Duplex (FDD) communications are used for bidirectional communications between the first receiving unit 2 and the second receiving unit 4 via the transmission cable 3. Time Division Duplex (TDD) communication alternately performs sending and receiving operations in different time slots. Frequency Division Duplex (FDD) communication simultaneously performs sending and receiving operations in separate frequency bands.

The following describes an operation of the vehicle-mounted diversity receiving system 100 shown in FIG. 1 to FIG. 3.

When the user performs an operation to prompt the start of the receiving operation and another operation to specify a desired broadcasting station using the operating unit, the second receiving unit 4 transmits the operation data modulation signal OTX, which is obtained by performing the error correction coding and modulation on the operation data indicative of the operation contents, to the first receiving unit 2 via the transmission cable 3.

The first receiving unit 2 performs demodulation and error correction on the received operation data modulation signal to obtain the operation data OD indicative of the operation content of the user. In response to the instruction for starting the receiving operation indicated by the operation data, the high-frequency signal processor 21 and the demodulation/decoding processor 22 of the first receiving unit 2 start the operation. That is, first, the high-frequency signal processor 21 down-converts the high-frequency signals $R_1$ to $R_n$, which are received from the respective antenna $1_1$ to $1_n$ via the high frequency transmission cable, to a frequency bandwidth of the broadcasting station indicated by the station-selecting information included in the operation data. Thus, the signals $IF_1$ to $IF_n$ in the intermediate frequency band are obtained. Next, the demodulation/decoding processor 22 demodulates, synthesizes (addition or subtraction with weighting), and decodes the respective signals $IF_1$ to $IF_n$. Thus, the received information data RXD, which is generated by converting a broadcasted content (audio and video data) into MPEG data, is obtained. The first receiving unit 2 then transmits the modulation signal RTX, which is obtained by performing error correction coding and modulation on the received information data RXD, to the second receiving unit 4 via the transmission cable 3.

The second receiving unit 4 performs demodulation, error correction, and MPEG decoding on the received modulation signal and obtains video and audio data, which is the broadcasted content.

Thus, the vehicle-mounted diversity receiving system 100 shown in FIG. 1 to FIG. 3 divides the signal receiving device into the first receiving unit 2, which carries out a predetermined part of the signal receiving process, and the second receiving unit 4, which carries out the remaining part of the receiving process. The first receiving unit 2 is installed adjacent to the antennas $1_1$ to $1_n$ and the second receiving unit 4 is installed at the center console in the vehicle cabin. The vehicle-mounted diversity receiving system 100 bidirectionally transmits signals (OTX, RTX) between the first receiving unit 2 and the second receiving unit 4 via a single signal line of the transmission cable 3 while superimposing the DC power supply voltage (VDD) for operating the first receiving unit 2 onto this signal line, so as to supply the first receiving unit 2 with the DC power supply voltage (VDD).

This configuration can reduce the length of the high frequency transmission cables coupled between the antennas $1_1$ to $1_n$ and the first receiving unit 2, thereby achieving cost reduction. The single signal line is only used for signal transmission between the first receiving unit 2 and the second receiving unit 4 and for feeding electricity to the second receiving unit 4. This allows use of the transmission cable with reduced diameter, thereby facilitating cable wiring work in the vehicle cabin.

In the configuration shown in FIG. 2 and FIG. 3, the first receiving unit 2 performs wired transmission of the modulation signal RTX to the second receiving unit 4 via the transmission cable 3. The modulation signal RTX is obtained by performing an OFDM modulation, a QPSK modulation, or a digital modulation such as QAM (24) on the information data RXD, which is a rectangular-wave digital data signal composed of a binary signal series. This reduces the intensity of radiation noise emitted from the transmission cable 3, compared with the configuration in which the information data RXD is directly transmitted to the second receiving unit 4 via the transmission cable 3. Accordingly, degradation in signal receiving sensitivity, which is caused by this radiation noise mixed in the first receiving unit 2, can be reduced or eliminated in the configuration of FIGS. 2 and 3.

To further reduce the intensity of the radiation noise emitted from the transmission cable 3, the amplitude of the modulation signal RTX on the transmission cable 3 may be decreased to the extent that transmission quality is not degraded. This modification will be described with reference to FIG. 4 and FIG. 5.

Figure 4:
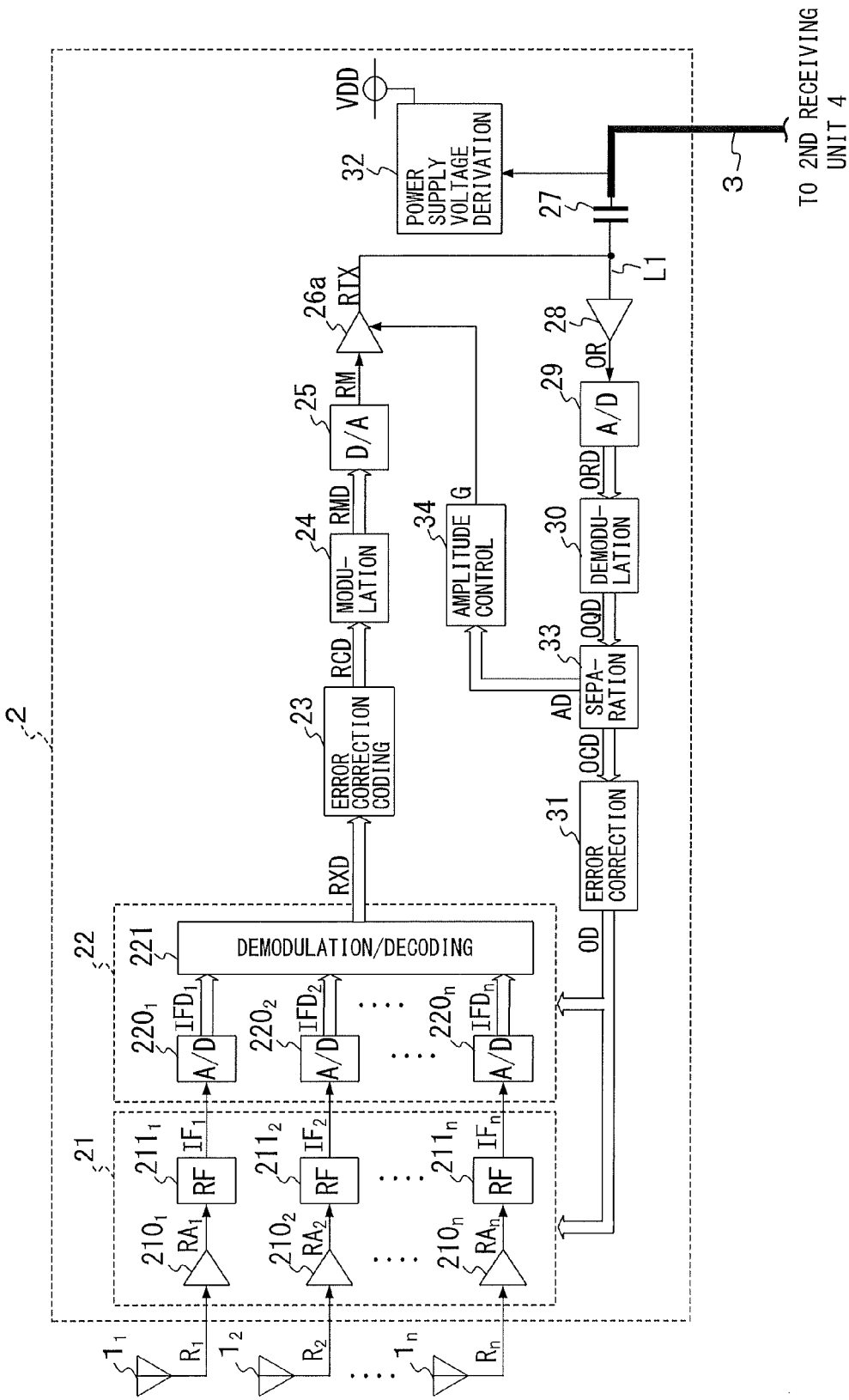
FIG. 4 is a block diagram illustrating an internal configuration of a first receiving unit according to a second embodiment of the invention.
Figure 5:
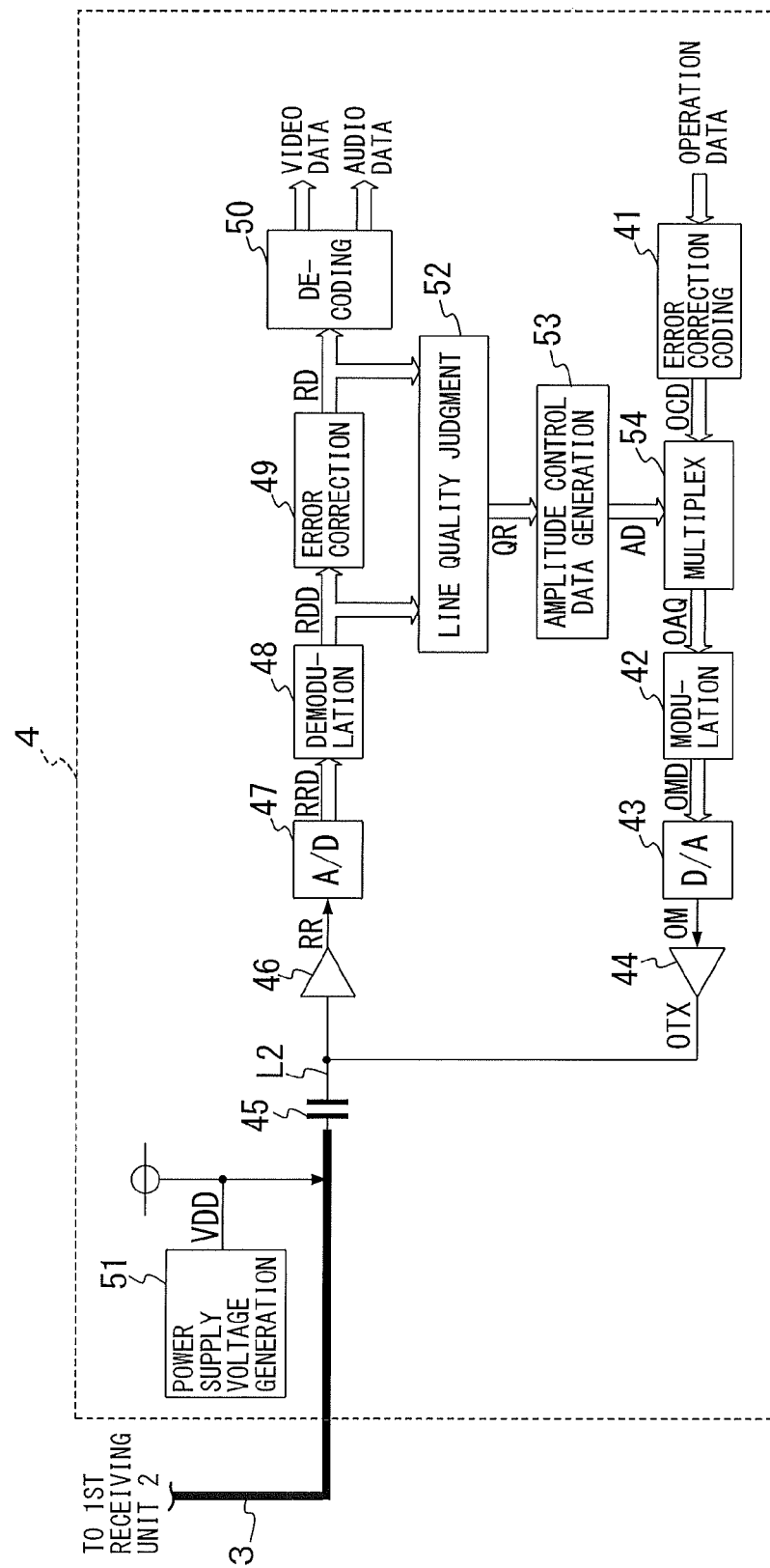
FIG. 5 is a block diagram illustrating an internal configuration of a second receiving unit according to the second embodiment.

FIG. 4 is a block diagram illustrating another exemplary internal configuration of the first receiving unit 2 and FIG. 5 is a block diagram of an exemplary internal configuration of the second receiving unit 4. In FIG. 4, a separation circuit 33 and an amplitude control circuit 34 are added to the configuration shown in FIG. 2, and a variable gain transmission-side amplifier 26*a* is employed instead of the transmission-side amplifier 26 shown in FIG. 2. Other than those elements, FIG. 4 illustrates the same configuration as the configuration shown in FIG. 2. In FIG. 5, a line quality judgment circuit 52, an amplitude control data generating circuit 53, and a multiplex circuit 54 are added to the configuration shown in FIG. 3. Other than those elements, FIG. 5 illustrates the same configuration as the configuration shown in FIG. 3.

In the first receiving unit 2 shown in FIG. 4, the separation circuit 33 divides the operation data OQD received from the demodulation circuit 30 into the operation data OCD and amplitude control data AD. The operation data OCD represents a received operation content. The amplitude control data AD indicates an amplitude control value that corresponds to an intended amount of increase or decrease in the amplitude of the modulation signal RTX. Then, the separation circuit 33 sends the operation data OCD to the error correction circuit 31 and sends the amplitude control data AD to the amplitude control circuit 34. The error correction circuit 31 performs an error correction process on the operation data OCD to obtain the operation data OD with error bit(s) corrected. The error correction circuit 31 sends the operation data OD to the high-frequency signal processor 21 and the demodulation/decoding processor 22. The amplitude control circuit 34 supplies the transmission-side amplifier 26a with a gain control signal G that increases or decreases an amplitude gain by the amount indicated by an amplitude control value given by the amplitude control data AD. The transmission-side amplifier 26a transmits the modulation signal RTX to the second receiving unit 4 via the line L1, the capacitor 27, and the signal line of the transmission cable 3. The modulation signal RTX is obtained by amplifying the modulation signal RM received from the D/A converter 25 with a modified amplitude gain. The modified amplitude gain is obtained by increasing or decreasing the current gain by an amount indicated by the gain control signal G.

In the second receiving unit 4 shown in FIG. 5, the line quality judgment circuit 52 checks (determines) line quality based on the information data RDD before error correction by the error correction circuit 49 and the information data RD after the error correction. That is, the line quality judgment circuit 52 calculates a bit error rate and an Error Vector Magnitude (EVM), which indicates modulation accuracy, based on the information data RDD and RD. The value of the EVM becomes larger as radiation noise entering the first receiving unit 2 increases. The bit error rate is very small if the amount of radiation noise is equal to or less than a predetermined amount and steeply increases if the amount of radiation noise is greater than the predetermined amount. The line quality judgment circuit 52 determines that the line quality is poor when the error rate is greater than the predetermined value and determines that the line quality is good when the error rate is smaller than the predetermined value. When the line quality is judged as poor, the line quality judgment circuit 52 supplies an amplitude control data generating circuit 53 with a quality judgment result signal QR indicative of "poor degree." The level of the poor degree becomes increases as the EVM value increases. On the other hand, when the line quality is judged as good, the line quality judgment circuit 52 supplies the amplitude control data generating circuit 53 with the quality judgment result signal QR indicative of "good degree," which increases as the EVM value decreases. If the quality judgment result signal QR indicates the poor degree, the amplitude control data generating circuit 53 supplies the multiplex circuit 54 with the amplitude control data AD indicative of the amplitude control value that increases the amplitude by the amount corresponding to the level of the poor degree. If the quality judgment result signal QR indicates the good degree, the amplitude control data generating circuit 53 supplies the multiplex circuit 54 with the amplitude control data AD indicative of the amplitude control value that reduces the amplitude by the amount corresponding to the level of the good degree. The multiplex circuit 54 supplies the modulation circuit 42 with multiplexed operation data OAQ, which is the product of multiplexing the amplitude control data AD onto the operation data OCD received from the error correction coding circuit 41. The modulation circuit 42 performs, for example, an OFDM modulation, a QPSK modulation, or a digital modulation such as QAM on the multiplexed operation data OAQ to obtain the operation data modulation signal OMD. The modulation circuit 42 supplies the D/A converter 43 with the operation data modulation signal OMD.

Thus, in the configurations shown in FIG. 4 and FIG. 5, the second receiving unit 4 judges the modulation signals (RTX, RR) received from the first receiving unit 2 via the transmission cable 3 for line quality (EVM, bit error rate). If the line quality is determined to be good, the second receiving unit 4 transmits a modulation signal toward the first receiving unit 2 via the transmission cable 3. This modulation signal is generated by multiplexing (modulating) the amplitude control data (AD), which reduces the amplitude of the received information modulation signal, onto the operation data (OCD), which instructs the operation of the receiving device (station selection, start of signal receiving process, and end of signal receiving process). On the other hand, if the line quality is determined to be poor, the second receiving unit 4 transmits a modulation signal toward the first receiving unit 2 via the transmission cable 3. This modulation signal is generated by multiplexing (modulating) the amplitude control data (AD), which increases the amplitude of the received information modulation signal, onto the operation data (OCD), which instructs the operation of the receiving device (station selection, start of signal receiving process, and end of signal receiving process). Upon receiving the modulation signal, the first receiving unit 2 separates and takes out the amplitude control data (AD) from the data series (OQD) obtained by demodulating the modulation signal. If the amplitude control data (AD) prompts to reduce the amplitude of the received information modulation signal, the first receiving unit 2 decreases the current gain of the transmission-side amplifier 26a to decrease the amplitude of the received information modulation signal that will be sent onto the transmission cable 3. On the other hand, if the amplitude control data (AD) prompts to increase the amplitude of the received information modulation signal, the first receiving unit 2 increases the current gain of the transmission-side amplifier 26a to increase the amplitude of the received information modulation signal that will be sent onto the transmission cable 3.

In this manner, the amplitude adjustment controls electric power to reduce the amplitude of the received information modulation signals (RTX, RR) transmitted via the transmission cable 3 until the line quality after reaching the second receiving unit 4 is judged to be poor.

This electric power control reduces the radiation noise by reducing the amplitude of the received information modulation signal RTX without significantly reducing the line quality.

It should be noted that each of the demodulation circuit 30 of the first receiving unit 2 and the demodulation circuit 48 of the second receiving unit 4 need to perform a demodulation process at the timing synchronized with the received signals (ORD, RRD). A modified embodiment, which takes this timing synchronization into account, will be described with reference to FIGS. 6 and 7.

Figure 6:
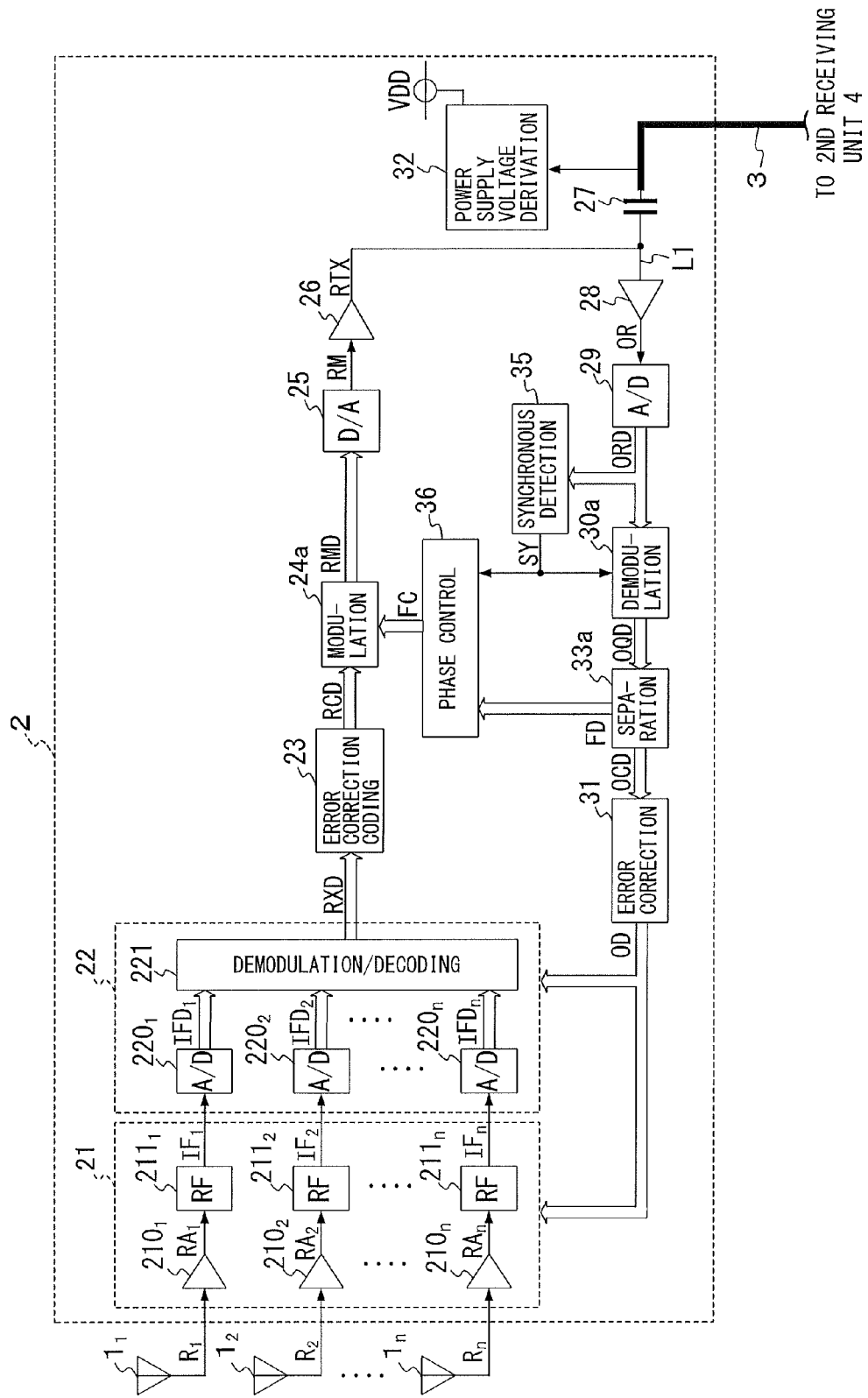
FIG. 6 is a block diagram illustrating an internal configuration of a first receiving unit according to a third embodiment of the invention.
Figure 7:
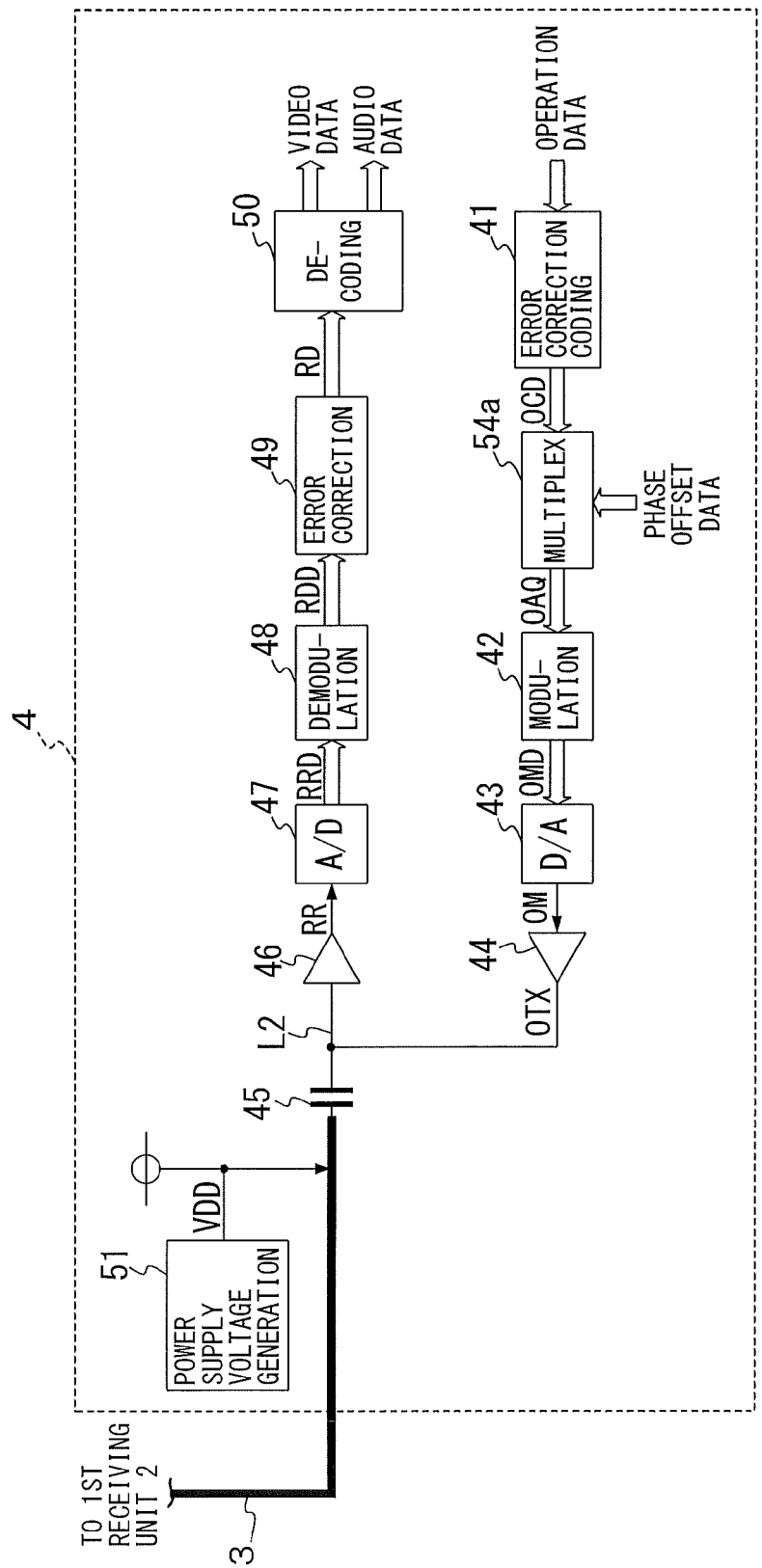
FIG. 7 is a block diagram illustrating an internal configuration of a second receiving unit of the third embodiment.

FIG. 6 and FIG. 7 are block diagrams illustrating another exemplary internal configurations of the first receiving unit 2 and the second receiving unit 4, respectively. In FIG. 6, a separation circuit 33a, a synchronous detection circuit 35, and a phase control circuit 36 are added to the configuration shown in FIG. 2 and a modulation circuit 24a and a demodulation circuit 30a are employed instead of the modulation circuit 24 and the demodulation circuit 30. Other than these components, the configuration shown in FIG. 6 is the same as the configuration shown in FIG. 2. In FIG. 7, a multiplex circuit 54a is added to the configuration shown in FIG. 3. Other than that, the configuration shown in FIG. 7 is the same as the configuration shown in FIG. 3.

In the first receiving unit 2 shown in FIG. 6, the synchronous detection circuit 35 detects a peak value of the operation data modulation signal ORD received from the A/D converter 29. Then, the synchronous detection circuit 35 supplies the demodulation circuit 30a and the phase control circuit 36 with a synchronous detection signal SY which synchronizes with detection of the peak value. The demodulation circuit 30a recovers the operation data by demodulating the operation data modulation signal ORD at the start timing corresponding to the synchronous detection signal SY, and supplies the separation circuit 33a with the recovered operation data (i.e., operation data OQD). The separation circuit 33a divides the operation data OQD received from the demodulation circuit 30a into the operation data OCD, which indicates the received operation content, and phase offset data FD, which indicates a predetermined phase offset amount. Then, the separation circuit 33a sends the operation data OCD to the error correction circuit 31 and sends the phase offset data FD to the phase control circuit 36. The error correction circuit 31 performs an error correction process on the operation data OCD to obtain the operation data OD with error bit (s) corrected. The error correction circuit 31 sends the operation data OD to the high-frequency signal processor 21 and the demodulation/decoding processor 22. The phase control circuit 36 shifts the phase of the synchronous detection signal SY by the phase offset amount indicated by the phase offset data FD to generate a phase control signal FC. The phase control circuit 36 then sends the phase control signal FC to the modulation circuit 24a. The modulation circuit 24a supplies the D/A converter 25 with the modulation signal RMD which is obtained by performing an OFDM modulation, a QPSK modulation, and a digital modulation such as QAM on the information data RCD received from the error correction coding circuit 23 at the start timing corresponding to the phase control signal FC.

In the second receiving unit 4 shown in FIG. 7, the multiplex circuit 54a supplies the modulation circuit 42 with the multiplexed operation data OAQ, which is the product of multiplexing the phase offset data, which is determined in accordance with environments of use of this system, onto the operation data OCD received from the error correction coding circuit 41.

According to the above-described configuration shown in FIGS. 6 and 7, the first receiving unit 2 of FIG. 6 transmits the received information modulation signals (RMD, RM, RTX) obtained by modulating the information data RCD to the second receiving unit 4 of FIG. 7 at the timing synchronized with the operation data modulation signal ORD transmitted from the second receiving unit 4. The demodulation circuit 48 of the second receiving unit 4 demodulates the modulation signal (RRD) at the predetermined fixed timing. That is, normally, the second receiving unit 4 also requires a synchronous detection circuit to determine the timing of demodulation at the demodulation circuit 48. However, in the vehicle-mounted diversity receiving system 100 shown in FIG. 1, equipment (transmission target) is limited to the first receiving unit 2 and the second receiving unit 4, and the cable length of the transmission cable 3 is fixed. Thus, the transmission delay time is given, i.e., the transmission delay time becomes a known value. This can fix the timing of the demodulation process at the demodulation circuit 48 of the second receiving unit 4 and eliminates the need for adding a header for synchronous detection to the received information modulation signal.

Accordingly, the synchronous detection circuit is not required in the second receiving unit 4. This achieves low power consumption and low cost. Since adding the header for synchronous detection is not necessary, transmission capacity can be increased. Redundancy for error correction in the received information modulation signal is increased by the amount of the increase in transmission capacity, and this enhances noise immunity.

In the configuration shown in FIG. 6 and FIG. 7, the synchronous detection circuit 35 and the phase control circuit 36 are disposed in the first receiving unit 2, and the first receiving unit 2 is installed adjacent to the antenna. It should be noted, however, that the synchronous detection circuit and the phase control circuit may be disposed only in the second receiving unit 4. Specifically, the synchronous detection circuit disposed in the second receiving unit 4 may perform synchronous detection from the received information data modulation signal RRD received from the A/D converter 47, to obtain the synchronous detection signal SY. Then, the phase control signal in accordance with the synchronous detection signal SY may be generated in the phase control circuit disposed at the second receiving unit 4, and the phase control signal may control the modulation timing of the modulation circuit 42.

Figure 8A:
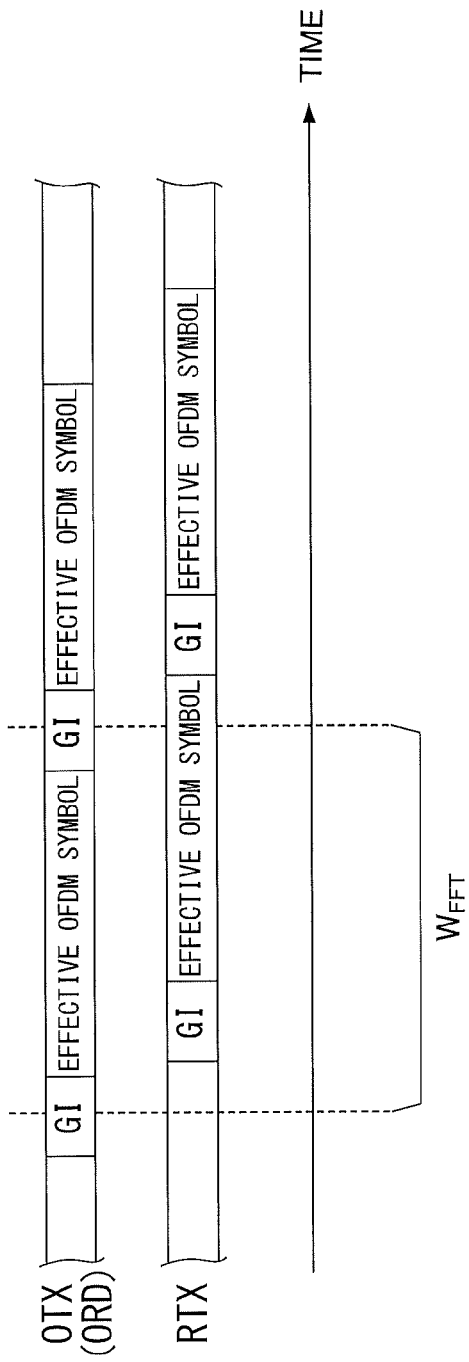
FIG. 8A and FIG. 8B are timing charts of an exemplary synchronization detection operation by the first receiving unit 2 shown in FIG. 6.
Figure 8B:
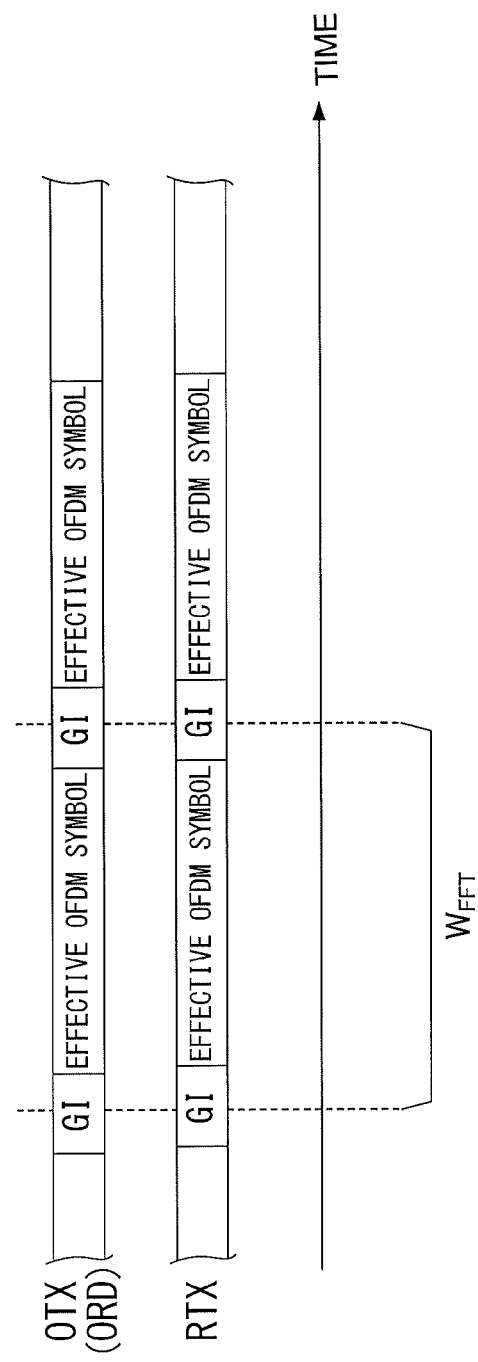

In the configuration shown in FIG. 6 and FIG. 7, if an FDD method is employed as a method of bidirectional communications between the first receiving unit 2 and the second receiving unit 4 and an OFDM modulation is employed as a modulation method for each of the modulation circuits 24a and 42, it is preferred that the OFDM modulation is performed to make the subcarrier signals of the modulation circuits 24a and 42 orthogonal to each other. That is, the array is configured such that the received information modulation signal RTX and the operation data modulation signal OTX simultaneously transmitted on the single signal line of the transmission cable 3 may be interfered with each other at minimum. In the synchronous detection circuit 35 shown in FIG. 6, for example, a guard interval range GI in the operation data modulation signal OTX (ORD) as shown in FIG. 8A received from the second receiving unit 4 is detected by a Fast Fourier Transform (FFT) window, and the synchronous detection signal SY synchronized with the guard interval range GI is generated. As shown in FIG. 8B, this allows synchronizing the timing of a received effective OFDM symbol in the operation data modulation signal OTX with the timing of a transmission effective OFDM symbol in the modulation signal RTX. As shown in FIG. 8B, if the difference in time position between the received effective OFDM symbols of the transmitting side and the receiving side is within the guard interval range GI, the orthogonal relationship between the subcarrier signals is maintained upon conversion of these two OFDM symbols into the subcarrier signal by FFT. This ensures good signal reception.

When the OFDM modulation is used as the modulation method of the modulation circuits 24a and 42, the electric power of the subcarrier, which is very likely to generate radiation noise, may be controlled so as to be forcibly reduced to decrease the intensity of the radiation noise. Another embodiment that takes this radiation noise reduction into account will be described with reference to FIGS. 9 and 10.

Figure 9:
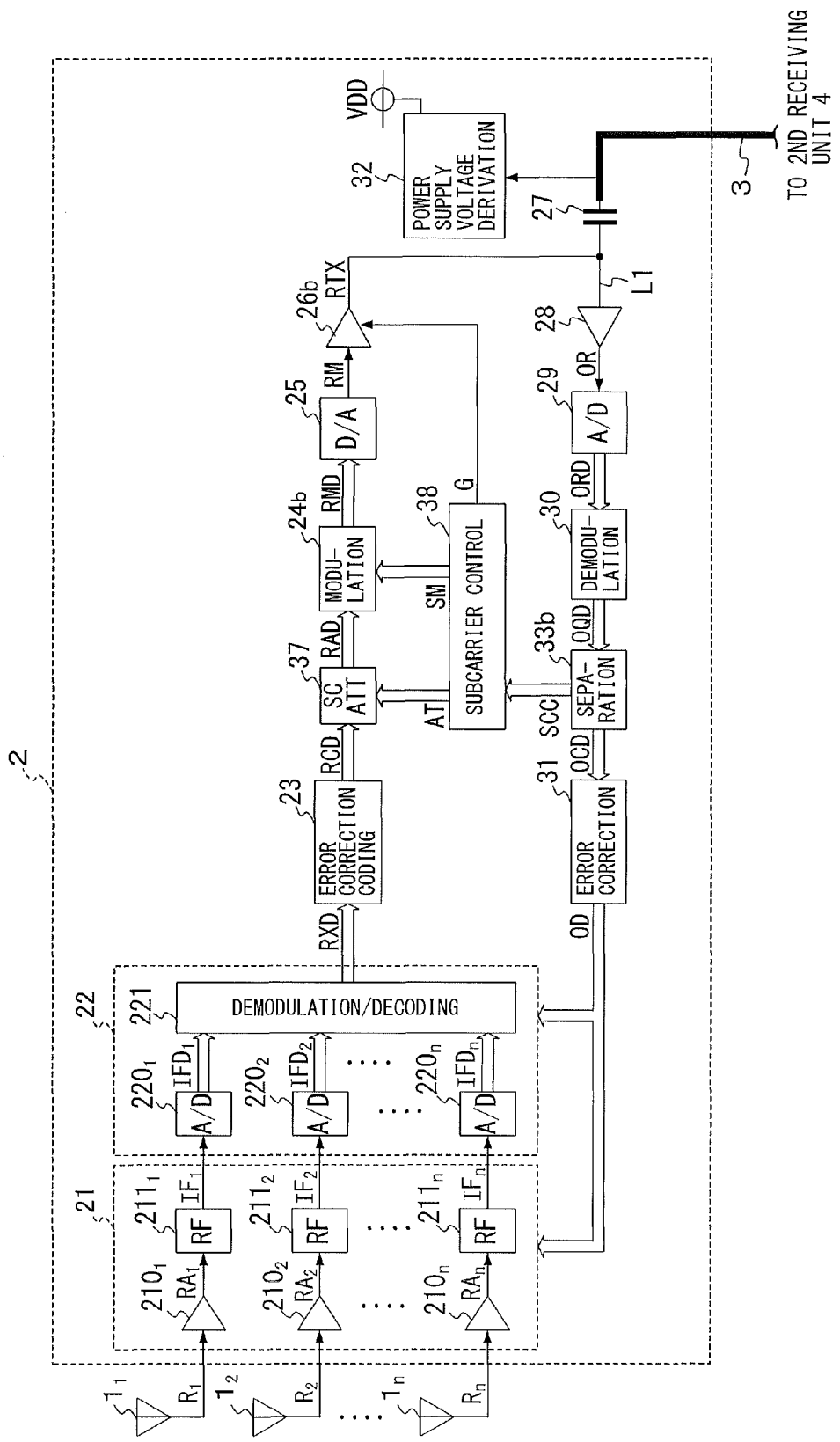
FIG. 9 is a block diagram illustrating an internal configuration of a first receiving unit according to a fourth embodiment of the invention.
Figure 10:
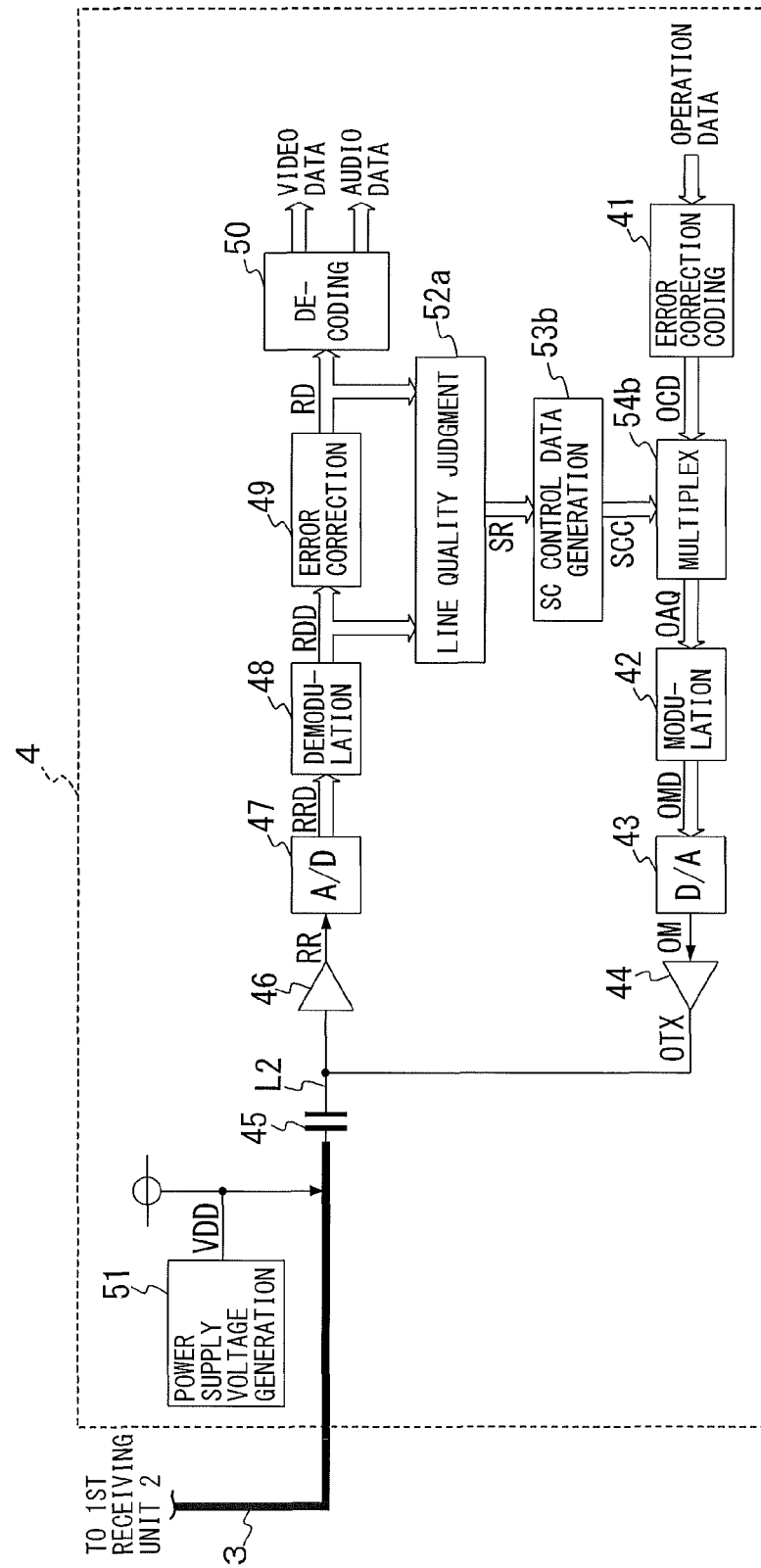
FIG. 10 is a block diagram illustrating an internal configuration of a second receiving unit of the fourth embodiment.

FIG. 9 and FIG. 10 are block diagrams illustrating another exemplary internal configurations of the first receiving unit 2 and the second receiving unit 4 respectively. In FIG. 9, a separation circuit 33b, a subcarrier attenuator 37 (hereinafter abbreviated as SCATT 37), and a subcarrier control circuit 38 are added to the configuration shown in FIG. 2, and a modulation circuit 24b and a transmission-side amplifier 26b are employed instead of the modulation circuit 24 and the transmissions-side amplifier 26 shown in FIG. 2. Other than these components, the configuration shown in FIG. 9 is the same as the configuration shown in FIG. 2. In FIG. 10, a line quality judgment circuit 52a, a subcarrier control data generating circuit 53b, and a multiplex circuit 54b are added to the configuration shown in FIG. 3. Other than these components, the configuration shown in FIG. 10 is the same as the configuration shown in FIG. 3.

In the first receiving unit 2 shown in FIG. 9, the separation circuit 33b divides the operation data OQD received from the demodulation circuit 30 into the operation data OCD indicative of the received operation content and subcarrier control data SCC (described later). Then, the separation circuit 33b sends the operation data OCD to the error correction circuit 31 and sends the subcarrier control data SCC to the subcarrier control circuit 38. If the subcarrier control data SCC includes subcarrier mask information (described below), the subcarrier control circuit 38 generates a 0-level setting signal AT that forcibly regulates the level of the received information data RCD to 0 level. The subcarrier control circuit 38 sends the 0-level setting signal AT to a SCATT 37. The SCATT 37 adjusts the level of the information data RCD to the 0 level in accordance with the 0-level setting signal AT, and supplies the modulation circuit 24b with the 0-level data as information data RAD. On the other hand, if the 0-level setting signal AT is not received, the information data RCD is directly sent to the modulation circuit 24b as the information data RAD. When modulation method change information (described below) is included in the subcarrier control data SCC, the subcarrier control circuit 38 supplies the modulation circuit 24b with modulation method change information SM for changing the modulation method. If the modulation method change information SM is not received, the modulation circuit 24b supplies the D/A converter 25 with the modulation signal RMD obtained by performing the OFDM modulation on the information data RAD. On the other hand, if the modulation method change information SM is received, the modulation circuit 24b changes the modulation to be performed on the information data RAD to another modulation method, for example, the QPSK modulation. The modulation circuit 24b supplies the D/A converter 25 with the modulation signal RMD which is obtained by performing the QPSK modulation on the information data RAD. The D/A converter 25 supplies the transmission-side amplifier 26b with the modulation signal RM. The modulation signal RM is obtained by converting one-bit data series of the modulation signal RMD into an analog signal. If the subcarrier control data SCC includes amplitude reduction subcarrier information (described below), the subcarrier control circuit 38 supplies a variable gain transmission-side amplifier 26b with the gain control signal G for setting the current gain to a gain indicated by the amplitude reduction subcarrier information. The transmission-side amplifier 26b amplifies the modulation signal RM by the gain indicated by the gain control signal G to obtain a modulation signal RTX, and transmits the modulation signal RTX to the second receiving unit 4 via the line L1, the capacitor 27, and the signal line of the transmission cable 3.

In the second receiving unit 4 shown in FIG. 10, the line quality judgment circuit 52a determines line quality of each subcarrier based on the information data RDD before error correction by the error correction circuit 49 and the information data RD after the error correction. That is, the line quality judgment circuit 52a first calculates the error rate and EVM of each subcarrier in the received modulation signal RR based on the information data RDD and RD. Next, the line quality judgment circuit 52a judges that the line quality is poor for each subcarrier if the error rate is greater than the predetermined value, and judges that the line quality is good if the error rate is smaller than the predetermined value. When the line quality is judged as poor, the line quality judgment circuit 52a supplies the subcarrier control data generating circuit 53b with a quality judgment result signal SR indicative of "poor degree," which becomes higher as the EVM value corresponding to the subcarrier increases. On the other hand, when the line quality is judged as good, the line quality judgment circuit 52a supplies the subcarrier control data generating circuit 53b with the quality judgment result signal SR indicative of "good degree," which becomes higher as the EVM value corresponding to the subcarrier decreases.

Figure 11A:
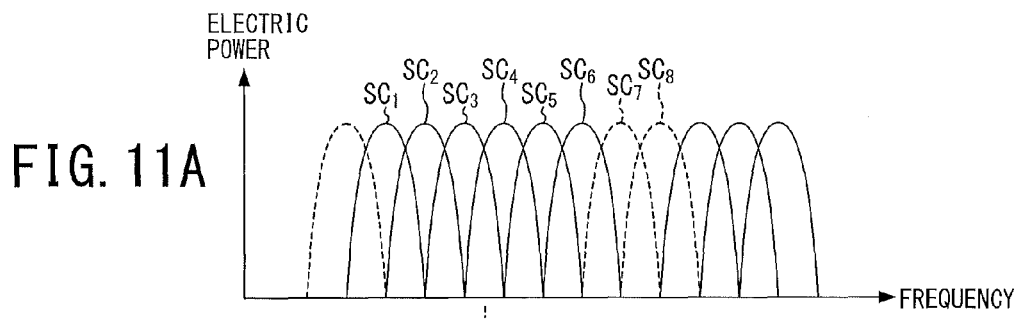
FIG. 11A to FIG. 11C are graphs illustrating an operation of the first receiving unit shown in FIG. 9.

The subcarrier control data generating circuit 53b first generates the subcarrier mask information, the modulation method change information, and the amplitude reduction subcarrier information for, for example, each of effective subcarriers $SC_1$ to $SC_6$ among the eight subcarriers $SC_1$ to $SC_8$ in the modulation signal RR as shown in FIG. 11A. Among the six effective subcarriers $SC_1$ to $SC_6$, if four subcarriers are at least required, the subcarrier control data generating circuit 53b selects two subcarriers having the first-lowest and second-lowest line quality, namely, the two subcarriers SC with the high EVM value, from the subcarriers $SC_1$ to $SC_6$ and generates the subcarrier mask information corresponding to these two subcarriers SC. If the line qualities of other subcarriers SC than the two subcarriers SC subject to the above-described subcarrier mask information are indicated as poor, the subcarrier control data generating circuit 53b generates modulation method change information for changing the modulation method of the subcarriers SC from the OFDM modulation to another modulation, for example, the QPSK modulation. The subcarrier control data generating circuit 53b generates amplitude reduction subcarrier information for reducing the amplitude gain in the transmissions-side amplifier 26b with respect to the bandwidth of the subcarrier SC which has a good line quality. Then, the subcarrier control data generating circuit 53b generates the subcarrier control data SCC including the subcarrier mask information, the modulation method change information, and the amplitude reduction subcarrier information and supplies the multiplex circuit 54b with the subcarrier control data SCC. The multiplex circuit 54b supplies the modulation circuit 42 with the multiplexed operation data OAQ, which is the product of multiplexing the subcarrier control data SOC onto the operation data OCD received from the error correction coding circuit 41.

Thus, in the configuration shown in FIG. 9 and FIG. 10, first, the line quality determination circuit 52a of the second receiving unit 4 determines the quality (EVM and bit error rate) of the modulation signal, which is received from the first receiving unit 2 and is modulated by the OFDM modulation, for each subcarrier. Next, the subcarrier control data generating circuit 53b of the second receiving unit 4 generates the subcarrier mask information, the modulation method change information, and the amplitude reduction subcarrier information. The subcarrier mask information designates the subcarriers with the first-lowest and second-lowest line qualities as masking targets. The modulation method change information instructs to change the modulation method to another modulation method if there are many subcarriers judged to have poor line quality. The amplitude reduction subcarrier information is used to reduce the amplitude of the subcarrier judged to have good line quality. Then, the subcarrier control data generating circuit 53b generates the subcarrier control data SCC including the subcarrier mask information, the modulation method change information, and the amplitude reduction subcarrier information. The second receiving unit 4 multiplexes the subcarrier control data SCC with the operation data indicating the operation content of the receiving device and transmits the multiplexed data to the first receiving unit 2.

The first receiving unit 2 controls the SCATT 37, the modulation circuit 24a, and the transmission-side amplifier 26b based on the subcarrier control data SCC. Specifically, among the effective subcarriers $SC_1$ to $SC_6$ as shown in FIG. 11A, the SCATT 37 sets, as masking targets, the bandwidths of the subcarriers SC with the first-lowest and second-lowest line qualities indicated by the subcarrier mask information. The SCATT 37 performs level adjustment on the information data RCD to forcibly turn the level in the mask-target bandwidth to 0 level. When the modulation method change information for instructing the change of the modulation method from the OFDM modulation to the QPSK modulation is not included in the subcarrier control data SCC, the modulation circuit 24a performs the OFDM modulation on the information data RAD. On the other hand, when such modulation method change information is included in the subcarrier control data SCC, the modulation circuit 24a performs the QPSK modulation on the information data RAD. The transmission-side amplifier 26b amplifies the modulation signal RM with the gain, which is indicated by the amplitude reduction subcarrier information for reducing the amplitude of the subcarrier with good line quality.

Figure 11B:
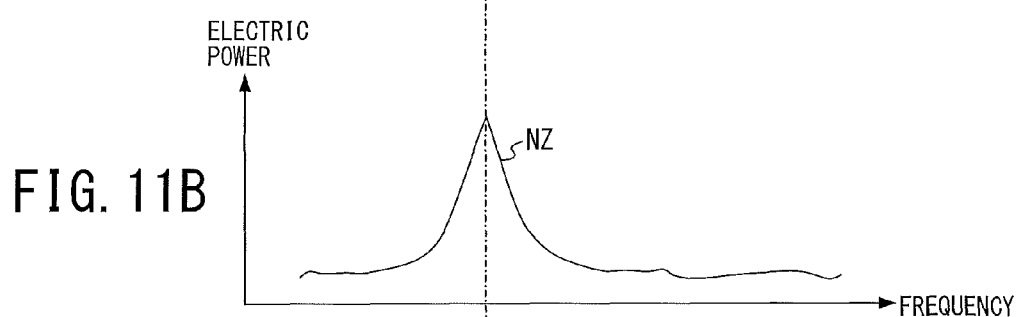
Figure 11C:
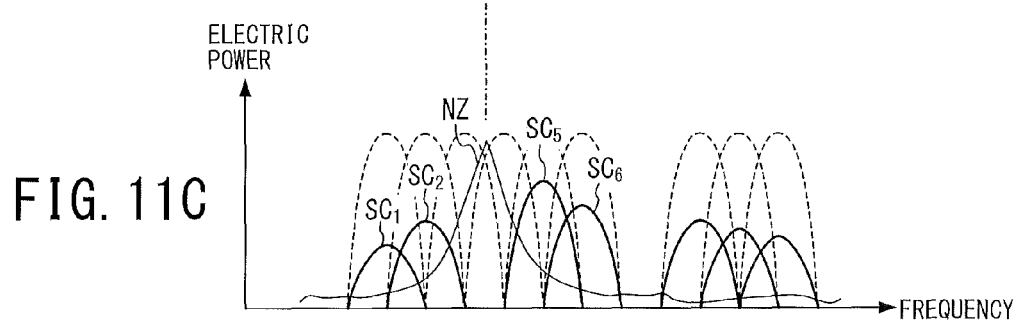

If the largest radiation noise NZ is present in a bandwidth corresponding to the two effective subcarriers $SC_3$ and $SC_4$, among the six effective subcarriers $SC_1$ to $SC_6$ as shown in FIG. 11B, then the above-described operation sets the subcarriers $SC_3$ and $SC_4$ in the subcarrier mask information as the mask target. With the subcarrier mask information, the SCATT 37 adjusts the levels of the bandwidths corresponding to the subcarriers $SC_3$ and $SC_4$ in the information data RCD series to 0 level. As shown in FIG. 11C, this makes respective electric powers corresponding to the subcarriers $SC_3$ and $SC_4$ among the effective subcarriers $SC_1$ to $SC_6$ 0 level in the modulation signal RM. In the bandwidth where the strength of the radiation noise NZ is reduced, namely, the subcarriers $SC_1$, $SC_2$, $SC_5$, and $SC_6$ as shown in FIG. 11C, the line quality is judged to be good, and therefore the amplitude reduction subcarrier information for reducing the amplitude in the bandwidth of each of the subcarriers $SC_1$, $SC_2$, $SC_5$, and $SC_6$, is generated. Based on the amplitude reduction subcarrier information, the transmission-side amplifier 26b amplifies the modulation signal RM with the gain for reducing the amplitude in the bandwidth of each of the subcarriers $SC_1$, $SC_2$, $SC_5$, and $SC_6$. As shown in FIG. 11C, this reduces electric powers corresponding to the subcarriers $SC_1$, $SC_2$, $SC_5$, and $SC_6$ significantly by the level of the good degree in the line quality.

In the configuration shown in FIG. 9 and FIG. 10, before starting communications between the first receiving unit 2 and the second receiving unit 4 using the OFDM modulation, each subcarrier is judged for line quality by the second receiving unit 4, and the line quality judgment results (SR, SCC) are transmitted to the first receiving unit 2 via the transmission cable 3. Then, the signal level corresponding to the subcarrier having the lowest line quality is set to 0 level by the first receiving unit 2. An electric power control is also performed by the first receiving unit 2 by means of reducing an amplitude of a signal corresponding to the subcarrier having a good line quality. Then, the first receiving unit 2 transmits the received information modulation signal, which is obtained by receiving the broadcast wave at the antennas $1_1$ to $1_n$, to the second receiving unit 4 via the transmission cable 3.

This eliminates (removes) those subcarriers which are significantly affected by the radiation noise from the transmission cable 3. This also reduces the electric power of the received information modulation signal transmitted on the transmission cable 3 to a lower value while suppressing significant reduction in the line quality. Consequently, it is possible to weaken the intensity of radiation noise emitted from the transmission cable 3. Accordingly, this ensures a quality communication with the radiation noise suppressed.

In the embodiment shown in FIG. 9 and FIG. 10, transmission electric power is controlled in the first receiving unit 2 using the SCATT 37, the subcarrier control circuit 38, and the transmission-side amplifier 26b. It should be noted, however, that the components used for this electric power control may be provided in the second receiving unit 4.

A frequency error caused by, for example, a difference in environmental temperature may occur in a clock oscillator (not shown) used in the modulation circuit 24 of the first receiving unit 2 shown in FIG. 2 and another clock oscillator (not shown) used in the modulation circuit 42 of the second receiving unit 4 shown in FIG. 3. An embodiment that takes such frequency error into account will be described with reference to FIG. 12.

Figure 12:
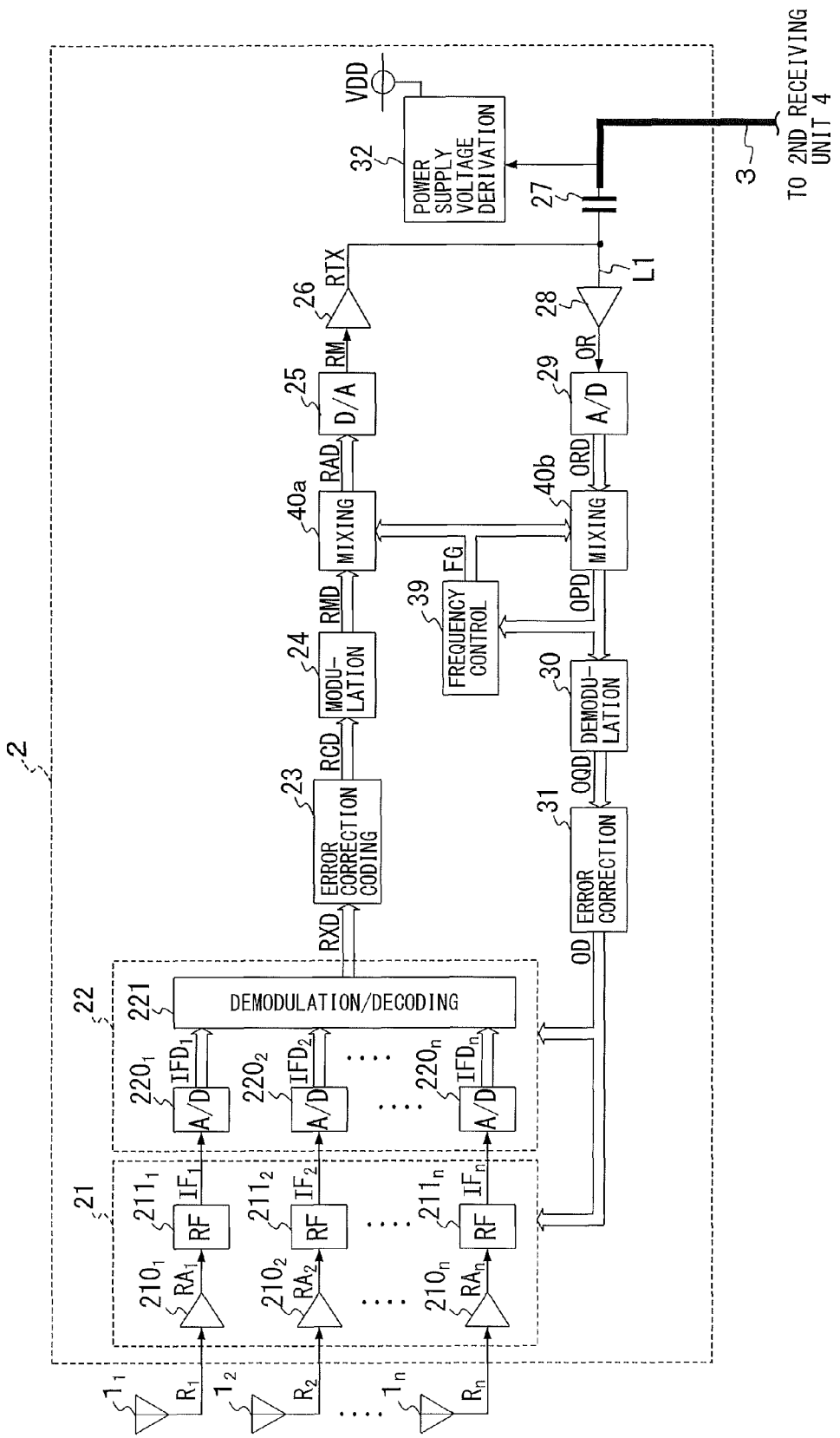
FIG. 12 is a block diagram illustrating an internal configuration of the first receiving unit of a fifth embodiment of the present invention.

To correct the frequency error and ensure sufficient line quality, the first receiving unit 2 having the internal configuration as shown in FIG. 12 may be used instead of that having the internal configuration shown in FIG. 2. In the first receiving unit 2 shown in FIG. 12, a frequency control circuit 39 and two frequency mixing circuits 40a and 40b are added to the configuration in FIG. 2. Other than these components, the configuration shown in FIG. 12 is the same as the configuration shown in FIG. 2. As the second receiving unit 4, the one shown in FIG. 3 is used.

In FIG. 12, the frequency control circuit 39 detects a frequency difference between an operation data modulation signal OPD received from the frequency mixing circuit 40b and a predetermined reference frequency. The frequency control circuit 39 sends a frequency error signal FG corresponding to the frequency difference to each of the frequency mixing circuits 40a and 40b. The frequency mixing circuit 40a performs complex multiplication between the modulation signal RMD received from the modulation circuit 24 and the frequency error signal FG so as to generate the modulation signal RAD with frequency corrected. The frequency mixing circuit 40a sends the modulation signal RAD to the D/A converter 25. The D/A converter 25 obtains the modulation signal RM by converting one-bit data series of the modulation signal RAD into an analog signal. The D/A converter 25 sends the modulation signal RM to the transmission-side amplifier 26. The frequency mixing circuit 40b performs complex multiplication between the operation data modulation signal ORD received from the A/D converter 29 and the frequency error signal FG so as to generate the operation data modulation signal OPD with the frequency corrected. The frequency mixing circuit 40b sends the operation data modulation signal OPD to the demodulation circuit 30. The demodulation circuit 30 demodulates the operation data modulation signal OPD to obtain the operation data OQD, and supplies the error correction circuit 31 with the operation data OQD.

In the configuration shown in FIG. 12, therefore, the frequency error (FG) between the modulation signal RMD after the modulation and the reference frequency is detected by the first receiving unit 2. The modulation signal RMD is corrected by the amount of frequency error (FG) (40a) and transmitted to the second receiving unit 4 as the modulation signal RTX. This configuration eliminates the necessity of a frequency error correction process in the second receiving unit 4, thereby contributing to a circuit size reduction and the power consumption reduction.

It should be noted that although in the configuration shown in FIG. 12 the circuits 39 and 40 that carry out the frequency error correction are disposed in the first receiving unit 2, these circuits may be disposed in the second receiving unit 4 only.

As described above, according to the present invention, the receiving device is divided into the first receiving unit 2, which carries out the receiving process of the front part, and the second receiving unit 4, which carries out the receiving process of the rear part, and the communications between the two receiving units 2 and 4 are performed via the transmission cable 3. The first receiving unit 2 includes the demodulation decoding unit 22 and first transmission-side processors 23 to 26. The demodulation decoding unit 22 demodulates, synthesizes, and decodes the signals $IF_1$ to $IF_n$ obtained by receiving a broadcast signal at the antennas $1_1$ to $1_n$ so as to obtain the received information data RXD. The first transmission-side processors 23 to 26 deliver onto the transmission cable 3 the received information modulation signal that is obtained by performing a predetermined modulation process on the received information data. The second receiving unit 4 includes the first receiving-side processors 46 to 49 and data decoder 50. The first receiving-side processors obtain the received information data by demodulating the received information modulation signal, which is received via the transmission cable 3, with a demodulation process corresponding to the predetermined modulation process. The data decoder 50 obtains the information data by decoding the received information data.

Dividing the signal receiving device into the first signal-receiving unit 2, which carries out the signal receiving process of the front part, and the second signal-receiving unit 4, which carries out the signal receiving process of the rear part, can reduce the cable length of the antenna cable for high frequency transmission, and can achieve cost reduction. Further, the above-described configuration ensures reduction in intensity of radiation noise emitted from the transmission cable 3 that couples between the first receiving unit 2 and the second receiving unit 4. This reduces or avoids deterioration in signal-receiving sensitivity caused by the radiation noise mixed in the first receiving unit 2.

In the above-described embodiments each of the first receiving unit 2 and the second receiving unit 4 is formed in a single semiconductor chip. The present invention is not limited in this regard. For example, each of the first receiving unit 2 and the second receiving unit 4 may be divided into two or more semiconductor chips. Although in the above-described embodiments the first receiving unit 2 is formed in a single first semiconductor chip, the demodulation decoding unit 22 and the first transmission-side processor 23 to 26 included in the first receiving unit 2 may be formed on separate semiconductor chips, respectively. In other words, the first receiving unit 2 may be divided into a semiconductor chip, where the high-frequency signal processor 21 and the demodulation/decoding processor 22 are formed, and another semiconductor chip where other parts 23 to 32 are formed.

This application is based on Japanese Patent Application No. 2012-287707 filed on Dec. 28, 2012 and the entire disclosure thereof is incorporated herein by reference.

What is claimed is:

1. A receiving system for obtaining information data based on a plurality of received signals obtained by receiving a broadcast wave, which carries coded information data, with a plurality of antennas, the receiving device comprising:
   a first receiving semiconductor chip that includes a demodulation decoding circuit and a first transmission processor, the demodulation decoding circuit being configured to demodulate and synthesize the plurality of received signals such that the signals received from respective antennas are added or subtracted with weighting and to decode a synthesized signal to obtain received information data, and the first transmission processor being configured to perform a predetermined modulation process on the received information data to obtain a received information modulation signal and send the received information modulation signal to a transmission cable; and
   a second receiving semiconductor chip that includes a first receiving processor and a data decoder, the first receiving processor being configured to receive the received information modulation signal via the transmission cable, and to obtain the received information data by demodulating the received information modulation signal with a demodulation process that corresponds to the predetermined modulation process, and the data decoder being configured to decode the received information data to obtain the information data,
   wherein the second receiving semiconductor chip further includes a power supply voltage generating circuit, the power supply voltage generating circuit being configured to generate a DC power supply voltage for operating the first receiving semiconductor chip and applying the DC power supply voltage to the transmission cable, and
   wherein the first receiving semiconductor chip further includes a power supply voltage derivation circuit configured to derive the power supply voltage from the transmission cable.

2. The receiving system according to claim 1, wherein the second receiving semiconductor chip further includes a second transmission processor, the second transmission processor being configured to perform the predetermined modulation process on operation data including station selection information to obtain an operation data modulation signal, and to send the operation data modulation signal to the first receiving semiconductor chip via the transmission cable, the station selection information specifying a desired broadcasting station; and
   wherein the first receiving semiconductor chip further includes a second receiving processor configured to receive the operation data modulation signal via the transmission cable and demodulate the operation data modulation signal cable with a demodulation process which corresponds to the predetermined modulation process to recover the operation data.

3. The receiving system according to claim 1, wherein the predetermined modulation process is the same modulation process as that performed on the broadcast wave.

4. The receiving system according to claim 2, wherein the second receiving semiconductor chip further includes a line quality judgment circuit and an amplitude control data generating circuit, the line quality judgment circuit being configured to determine a line quality of the transmission cable based on the received information data, and the amplitude control data generating circuit being configured to generate amplitude control data to decrease an amplitude of the received information modulation signal when the line quality is determined to be good,
    wherein the second transmission processor is configured to multiplex the amplitude control data with the operation data to obtain multiplexed data, configured to perform the predetermined modulation process on the multiplexed data to obtain an operation data modulation signal, and configured to transmit the operation data modulation signal to the first receiving semiconductor chip via the transmission cable,
    wherein the first receiving semiconductor chip further includes a separation circuit, the separation circuit being configured to receive the operation data modulation signal via the transmission cable, configured to demodulate the operation data modulation signal with a demodulation process, which corresponds to the predetermined modulation process, to obtain data, and configured to separately take the operation data and the amplitude control data from the obtained data, and
    wherein the first transmission processor is configured to decrease the amplitude of the received information modulation signal in accordance with the amplitude control data.

5. The receiving system according to claim 4, wherein the line quality is expressed by a bit error rate and a modulation accuracy in the received information data received by the second receiving semiconductor chip.

6. The receiving system according to claim 2, wherein the first receiving semiconductor chip includes a synchronous detection circuit configured to detect a synchronous signal based on the operation data modulation signal received via the transmission cable, and
    wherein the first transmission processor is configured to perform the predetermined modulation process on the received information data at timing decided by the synchronous signal.

7. The receiving system according to claim 6, wherein the predetermined modulation process is OFDM modulation, and the synchronous detection semiconductor chip uses a signal that synchronizes with a guard interval period in the operation data modulation signal as the synchronous signal.

8. The receiving system according to claim 2, wherein the predetermined modulation process is OFDM modulation,
    wherein the second receiving semiconductor chip further includes a line quality judgment circuit and a subcarrier control data generating circuit, the line quality judgment circuit being configured to determine a line quality of each subcarrier based on the received information data, and the subcarrier control data generating circuit being configured to generate subcarrier control data including subcarrier mask information and amplitude reduction subcarrier information, the subcarrier mask information indicating a subcarrier with a lowest line quality as a mask target, the amplitude reduction subcarrier information being used to decrease an amplitude of a subcarrier with the good line quality,
    wherein the second transmission processor is configured to multiplex the subcarrier control data with the operation data to obtain multiplexed data, configured to perform the predetermined modulation process on the multiplexed data to obtain an operation data modulation signal, and configured to send the operation data modulation signal to the first receiving semiconductor chip via the transmission cable,
    wherein the first receiving semiconductor chip further includes a separation circuit, the separation circuit being configured to receive the operation data modulation signal via the transmission cable, configured to demodulate the operation data modulation signal with a demodulation process which corresponds to the predetermined modulation process to obtain data, and configured to separately take the operation data and the subcarrier control data from the obtained data, and
    wherein the first transmission processor is configured to adjust a level of a bandwidth of the received information data corresponding to a subcarrier indicated by the subcarrier mask information included in the subcarrier control data to 0 level, and configured to decrease an amplitude of a bandwidth of the received information modulation signal corresponding to a subcarrier indicated by the amplitude reduction subcarrier information included in the subcarrier control data.

9. The receiving system according to claim 2, wherein the first receiving semiconductor chip further includes a frequency control circuit configured to generate a frequency error signal indicative of a frequency difference between a frequency of the received operation data modulation signal and a reference frequency, and the first transmission processor is configured to perform a frequency correction on the received information modulation signal in accordance with the frequency error signal.

10. A semiconductor device for obtaining information data based on a plurality of received signals obtained by receiving a broadcast wave with a plurality of antennas, the broadcast wave carrying coded information data, the semiconductor device comprising:
    a first semiconductor chip that includes a demodulation decoding circuit and a first transmission circuit, the demodulation decoding circuit being configured to demodulate and synthesize the plurality of received signals such that the signals received from respective antennas are added or subtracted with weighting and to decode a synthesized signal to obtain received information data, the first transmission circuit being configured to perform a predetermined modulation process on the received information data to obtain a received information modulation signal and configured to send the received information modulation signal to a transmission cable; and
    a second semiconductor chip that includes a first receiving circuit and a data decoder, the first receiving circuit being configured to receive the received information modulation signal via the transmission cable and obtain the received information data by demodulating the received information modulation signal with a demodulation process which corresponds to the predetermined modulation process, the data decoder being configured to obtain the information data by decoding the received information data,
    wherein the second semiconductor chip further includes a power supply voltage generating circuit configured to generate a DC power supply voltage for operating the first semiconductor chip and apply the DC power supply voltage to the transmission cable, and
    wherein the first semiconductor chip further includes a power supply voltage derivation circuit configured to derive the power supply voltage from the transmission cable.

11. The semiconductor device according to claim 10, wherein the second semiconductor chip further includes a second transmission circuit, the second transmission circuit being configured to perform the predetermined modulation process on operation data including station selection information to obtain an operation data modulation signal, and configured to send the operation data modulation signal to the transmission cable, the station selection information specifying a desired broadcasting station, and wherein the first semiconductor chip further includes a second receiving circuit configured to receive the operation data modulation signal via the transmission cable and demodulate the operation data modulation signal with a demodulation process which corresponds to the predetermined modulation process to recover the operation data.

12. The semiconductor device according to claim 10, wherein the predetermined modulation process is the same modulation process as that performed on the broadcast wave.

13. The semiconductor device according to claim 11, wherein the second semiconductor chip further includes a line quality judgment circuit and an amplitude control data generating circuit, the line quality judgment circuit being configured to determine a line quality of the transmission cable based on the received information data, and the amplitude control data generating circuit being configured to generate amplitude control data to decrease an amplitude of the received information modulation signal when the line quality is determined to be good, wherein the second transmission circuit is configured to multiplex the amplitude control data with the operation data to obtain multiplexed data, configured to perform the predetermined modulation process on the multiplexed data to obtain an operation data modulation signal, and configured to send the operation data modulation signal to the first semiconductor chip via the transmission cable, wherein the first semiconductor chip further includes a separation circuit, the separation circuit being configured to receive the operation data modulation signal via the transmission cable, configured to demodulate the operation data modulation signal with a demodulation process, which corresponds to the predetermined modulation process, to obtain data, and configured to separately take the operation data and the amplitude control data from the obtained data, and wherein the first transmission circuit is configured to decrease the amplitude of the received information modulation signal in accordance with the amplitude control data.

14. The semiconductor device according to claim 13, wherein the line quality is expressed by a bit error rate and a modulation accuracy in the received information data received by the second semiconductor chip.

15. The semiconductor device according to claim 11, wherein the first semiconductor chip includes a synchronous detection circuit configured to detect a synchronous signal based on the operation data modulation signal received via the transmission cable, and wherein the first transmission circuit is configured to perform the predetermined modulation process on the received information data at timing decided by the synchronous signal.

16. The semiconductor device according to claim 15, wherein the predetermined modulation process is OFDM modulation, and the synchronous detection circuit uses a signal that synchronizes with a guard interval period in the operation data modulation signal as the synchronous signal.

17. A method for obtaining information data based on a plurality of received signals obtained by receiving a broadcast wave carrying coded information data with a plurality of antennas, the method comprising:

demodulating and synthesizing the plurality of received signals such that the signals received from respective antennas are added or subtracted with weighting to obtain a synthesized signal;

decoding the synthesized signal to obtain received information data;

performing a predetermined modulation process on the received information data to obtain a received information modulation signal;

sending the received information modulation signal to a transmission cable;

receiving the received information modulation signal via the transmission cable;

demodulating the received information modulation signal with a demodulation process which corresponds to the predetermined modulation process to obtain the received information data;

decoding the received information data to obtain the information data; and applying a DC power supply voltage to the transmission cable and taking the power supply voltage from the transmission cable.

18. A semiconductor device for obtaining information data based on a plurality of received signals obtained by receiving a broadcast wave with a plurality of antennas, the broadcast wave carrying coded information data, the semiconductor device comprising:

a first semiconductor chip; and a second semiconductor chip that includes a first receiving circuit and a data decoder, the first receiving circuit being configured to receive a received information modulation signal via a transmission cable from the first semiconductor chip and to obtain the received information data by demodulating the received information modulation signal with a demodulation process which corresponds to a predetermined modulation process that is performed by the first semiconductor chip, the data decoder being configured to obtain the information data by decoding the received information data, wherein the second semiconductor chip further includes a power supply voltage generating circuit, the power supply voltage generating circuit being configured to generate a DC power supply voltage for operating the first semiconductor chip and applying the DC power supply voltage to the transmission cable, and wherein the first semiconductor chip includes a power supply voltage derivation circuit configured to derive the power supply voltage from the transmission cable.

\* \* \* \* \*